United States Patent
Maeda et al.

(10) Patent No.: US 9,419,741 B2
(45) Date of Patent: Aug. 16, 2016

(54) OPTICAL TRANSMISSION SYSTEM, MANAGEMENT DEVICE, AND SIGNAL ADJUSTMENT METHOD

(71) Applicant: FUJITSU LIMITED, Kawasaki-shi, Kanagawa (JP)

(72) Inventors: Taizo Maeda, Kawasaki (JP); Takuya Miyashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/314,259

(22) Filed: Jun. 25, 2014

(65) Prior Publication Data

US 2015/0016818 A1   Jan. 15, 2015

(30) Foreign Application Priority Data

Jul. 12, 2013   (JP) .................................. 2013-147027

(51) Int. Cl.
  *H04J 14/02*   (2006.01)
  *H04B 10/079*   (2013.01)
(52) U.S. Cl.
  CPC ...... *H04J 14/0221* (2013.01); *H04B 10/07955* (2013.01)
(58) Field of Classification Search
  CPC .................. H04J 14/0221; H04B 10/07955
  See application file for complete search history.

(56) References Cited

U.S. PATENT DOCUMENTS

| | | | | |
|---|---|---|---|---|
| 2005/0213966 A1* | 9/2005 | Chown | ................ | H04J 14/0221 398/27 |
| 2010/0111534 A1* | 5/2010 | Veselka, Jr. | ......... | H04J 14/0221 398/79 |
| 2010/0158532 A1* | 6/2010 | Goto | ................ | H04B 10/07955 398/81 |

FOREIGN PATENT DOCUMENTS

| | | |
|---|---|---|
| JP | 2000-059308 | 2/2000 |
| JP | 2011-518517 | 6/2011 |
| WO | WO 2009/128927 | 10/2009 |

* cited by examiner

*Primary Examiner* — David Payne
*Assistant Examiner* — Casey Kretzer
(74) *Attorney, Agent, or Firm* — Staas & Halsey LLP

(57) ABSTRACT

An optical transmission system includes: a plurality of optical transmission devices each including: an adjustment unit to adjust optical power of channels in the WDM optical signal; and a controller to control the adjustment unit based on an adjustment amount, and a management device including: a converter to convert an evaluation value for evaluating quality of service provided by using the channels in the WDM optical signal into a threshold value of transmission quality to be satisfied by the channels; and a determination unit to calculate the transmission quality of the channels based on monitoring information of the channels in the WDM optical signal adjusted by the adjusting unit of at least one of the plurality of optical transmission devices and to determine the adjustment amount to be set for the optical transmission device so that the calculated transmission quality of the channels satisfy the threshold value.

16 Claims, 20 Drawing Sheets

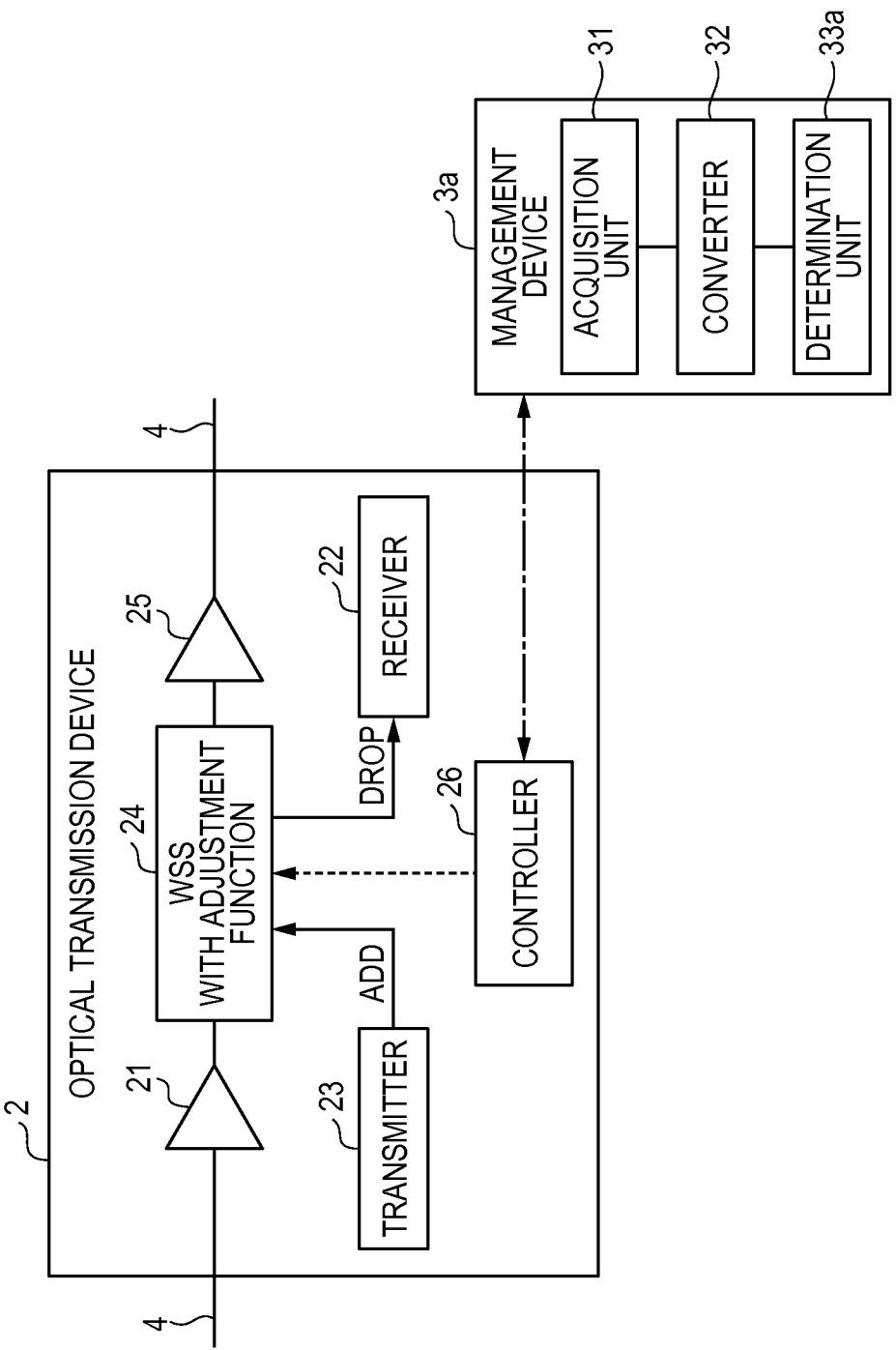

OPTICAL TRANSMISSION SYSTEM, MANAGEMENT DEVICE, AND SIGNAL ADJUSTMENT METHOD

CROSS-REFERENCE TO RELATED APPLICATION

This application is based upon and claims the benefit of priority of the prior Japanese Patent Application No. 2013-147027, filed on Jul. 12, 2013, the entire contents of which are incorporated herein by reference.

FIELD

The embodiments discussed herein are related to an optical transmission system, management device, and signal adjustment method.

BACKGROUND

A WDM transmission scheme is a known method of transmitting a large capacity of information at a time using a wavelength division multiplexed (WDM) optical signal obtained by multiplexing a plurality of optical signals with different wavelengths. A WDM transmission scheme is used for an optical transmission system such as a financial transaction system or data center system, for example. An optical transmission system with a WDM transmission scheme may adopt an evaluation value for evaluating the quality of services provided by use of channels in a WDM optical signal. Such an evaluation value is called a service level agreement (SLA). A service level agreement includes evaluation values such as availability or delay. Availability is the ratio of the time period for which a WDM optical signal is actually transmitted to the time period for which services are provided by use of channels in the WDM optical signal. Delay is a delay time allowed during transmission of a WDM optical signal.

There is a known technique for applying service restrictions as an SLA to channels in a WDM optical signal in order to ensure resources for channels in a WDM optical signal in an optical transmission system with a WDM transmission scheme, for example, Japanese National Publication of International Patent Application No. 2011-518517 is an example of the related technique.

SUMMARY

According to an aspect of the invention, an optical transmission system includes: a plurality of optical transmission devices that transmit a wavelength division multiplexed (WDM) optical signal through an optical transmission path, the optical transmission device including: an adjustment unit configured to adjust optical power of channels in the WDM optical signal; and a controller configured to control the adjustment unit based on an adjustment amount, and a management device that manages the plurality of optical transmission devices, the management device including: a converter configured to convert an evaluation value for evaluating quality of service provided by using the channels in the WDM optical signal into a threshold value of transmission quality to be satisfied by the channels; and a determination unit configured to calculate the transmission quality of the channels based on monitoring information of the channels in the WDM optical signal adjusted by the adjusting unit of at least one of the plurality of optical transmission devices and to determine the adjustment amount to be set for the optical transmission device so that the calculated transmission quality of the channels satisfy the threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 illustrates an example of the structure of an optical transmission device and the structure of a management device in an optical transmission system according to embodiment 2;

DESCRIPTION OF EMBODIMENTS

Since an optical transmission system with a WDM transmission scheme does not have a converter that converts an SLA for evaluating the quality of services provided by use of channels in a WDM optical signal into the transmission quality to be satisfied by the channels, the transmission quality of channels in the WDM optical signal is degraded.

That is, since there is not a converter that converts an SLA into the transmission quality to be satisfied by the channels, a regenerator (REG) is installed on the optical path of each channel to maintain the desired transmission quality of the channels in the WDM optical signal. Regenerators regenerate the waveform of a WDM optical signal using O (optical)/E (electrical)/O (optical) conversion. The delay time during transmission of the WDM optical signal increases as the number of REGs installed on the optical path of each channel grows. As a result, the transmission quality of the channels in the WDM optical signal may degrade. If the transmission quality of the channels in the WDM optical signal degrades, it is difficult for the quality of services provided by using the channels in the WDM optical signal to satisfy the SLA.

It is considered that optical transmission devices in an optical transmission system have wavelength selective switches (WSS) to suppress degradation of the transmission quality of the channels in the WDM optical signal. The WSS has a function of adjusting the optical power of channels in the WDM optical signal input from front stage side and outputting the adjusted WDM optical signal to the rear stage side. In such a structure, it is desirable to adjust the transmission quality of each channel on an autonomous basis depending on the SLA.

An optical transmission system, management device, and signal adjustment method that are able to adjust the transmission quality of the channels in the WDM optical signal on an autonomous basis depending on the SLA will be described in detail below with reference to the drawings. The technology to be disclosed is not restricted by these embodiments.

Embodiment 1

Figure 1:
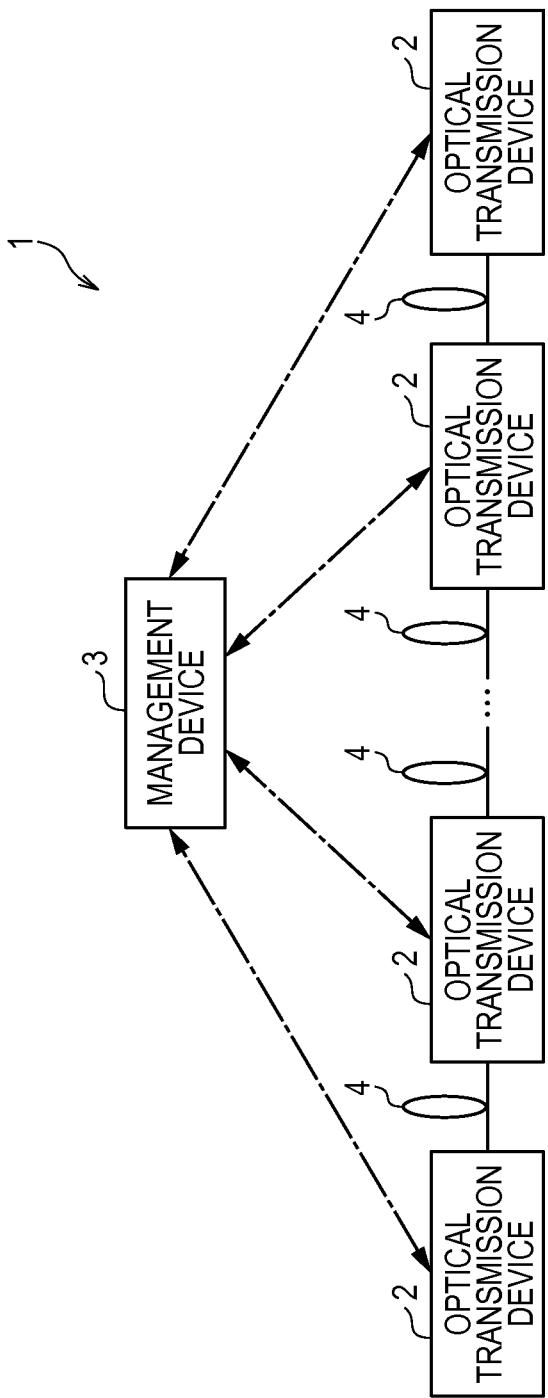
FIG. 1 illustrates an example of an optical transmission system according to embodiment 1.

FIG. 1 illustrates an example of an optical transmission system according to embodiment 1. An optical transmission system 1 depicted in FIG. 1 includes a plurality of optical transmission devices 2 connected through an optical transmission path 4 such as an optical fiber, and a management device 3, which manages the plurality of optical transmission devices 2. The wavelength division multiplexed (WDM) optical signal is transmitted to or received from another optical transmission device 2 through the optical transmission path 4. The optical transmission device 2 is, for example, an optical add-drop multiplexer (OADM), which is able to perform optical addition/drop for the WDM optical signal or an in-line amplifier (ILA), which is a relay node with a built-in amplifier for relaying between OADMs. At least one of a plurality of optical transmission devices 2 in the optical transmission system 1 is an OADM.

Figure 2:
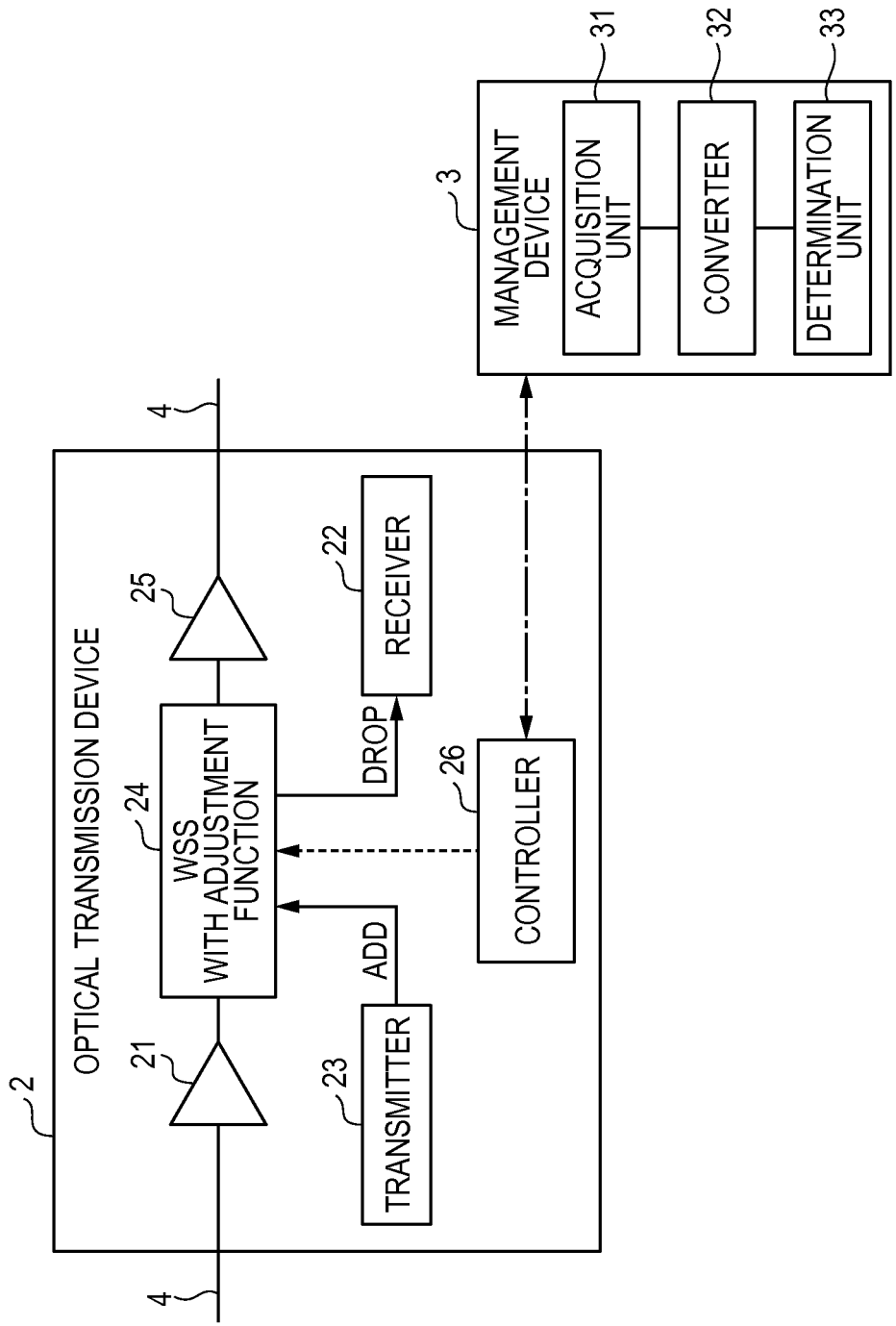
FIG. 2 illustrates an example of the structure of an optical transmission device and the structure of a management device in the optical transmission system according to embodiment 1.

FIG. 2 illustrates an example of the structure of the optical transmission device and the structure of the management device in the optical transmission system according to embodiment 1. FIG. 2 depicts only an example of the structure in which the optical transmission device is an OADM and does not depict an example of the structure in which the optical transmission device is an ILA for the purpose of description.

The optical transmission device 2 depicted in FIG. 2 includes a preamplifier 21, a receiver 22, a transmitter 23, a wavelength selective switch (WSS) with adjustment function 24, a post amplifier 25, and a controller 26. The preamplifier 21 amplifies the WDM optical signal received through the optical transmission path 4. The receiver 22 includes, for example, an array waveguide grating (AWG) and a transponder (TRP) and has a function of receiving an optical signal branched from the WDM optical signal received through the optical transmission path 4. The transmitter 23 includes, for example, an AWG and a TRP and has the function of transmitting the WDM optical signal into which an optical signal with a desired wavelength has been inserted to the optical transmission path 4.

The WSS with adjustment function 24 has a drop function that branches a received WDM optical signal to an optical signal in the channel corresponding to a desired wavelength and an add function that inserts an optical signal acquired from the transmitter 23 into the WDM optical signal, as in a general purpose WSS. In addition, the WSS with adjustment function 24 adjusts the optical power of channels in the WDM optical signal. The optical transmission device 2 that includes the WSS with adjustment function 24 is the optical transmission device 2 to be adjusted by the management device 3.

The controller 26 controls the transparency properties of the WSS with adjustment function 24 based on an adjustment amount set by the management device 3. The adjustment amount set by the management device 3 includes an attenuation amount for adjusting the optical power gains of channels in the WDM optical signal and so on. The post amplifier 25 amplifies the WDM optical signal adjusted by the WSS with adjustment function 24 and outputs the amplified signal to the optical transmission path 4.

The management device 3 that includes, for example, a general personal computer or workstation is connected with all optical transmission devices 2 in the optical transmission system 1 on local area network (LAN) or the like. The management device 3 includes an acquisition unit 31, a converter 32, and a determination unit 33. FIG. 2 depicts only the components relate to signal adjustment for adjusting the optical power of channels in the WDM optical signal and omits the components not related to the signal adjustment for the purpose of description.

The acquisition unit 31 acquires an evaluation value for evaluating the quality of services provided using channels in the WDM optical signal. Such an evaluation value is called a service level agreement (SLA). The SLA indicates an agreement under which the provider of a service that uses channels in the WDM optical signal ensures the details and quality of the service for the user of the service.

More specifically, the acquisition unit 31 acquires availability and delay as the SLA using an input unit such as a user interface. Availability is the rate of the time period for which the WDM optical signal is actually transmitted to the time period for which the service is provided using channels in the WDM optical signal.

Delay is the delay time allowed during transmission of the WDM optical signal. Delay is classified into a plurality of modes including "Premium", "Normal", and "Best effort" depending on the length of delay time. "Premium" is a mode indicating that the delay is shortest. "Best effort" is a mode indicating that the delay is longest. "Normal" is a mode indicating that the delay is standard between "Premium" and "Best effort". An SLA including availability, delay, and so on is acquired in relation to a combination of optical transmission devices 2 requested by the user or a pair of optical transmission devices 2, which are transmission source and transmission destination of the WDM optical signal.

The converter 32 converts the SLA acquired by the acquisition unit 31 into a threshold Qth of the Q values that has to be satisfied by channels in the WDM optical signal. The Q values are examples of transmission quality. Specifically, the converter 32 converts availability Pa of the SLA acquired by the acquisition unit 31 into a threshold Qth of the Q values that has to be satisfied by channels in the WDM optical signal.

An example of converting availability Pa into threshold Qth will be described below. First, the converter 32 calculates outage Po for each of optical paths corresponding to channels in the WDM optical signal based on availability Pa of the SLA. The outage indicates the probability at which transmission outage occurs on an optical path when the differential group delay (DGD) of the optical path exceeds predetermined DGD maximum value DGDmax. The following description uses a newly-established channel (referred to below as a new channel) for which an SLA is newly set among channels in the WDM optical signal, as an example.

When the total number of optical paths corresponding to a new channel is 1, the relation indicated by expression (1) below is established.

$$Pa = 1 - Po \quad (1)$$

When the total number of optical paths corresponding to a new channel is 2, the relation indicated by expression (2) below is established.

$$Pa = (1-Po) \times (1-Po) = 1 - 2Po + Po^2 \quad (2)$$

When the total number of optical paths corresponding to a new channel is 3, the relation indicated by expression (3) below is established.

$$Pa = (1-Po) \times (1-Po) \times (1-Po) = 1 - 3Po + 3Po^2 - Po^3 \quad (3)$$

Po is often sufficiently small in design of a physical layer, so $Po^2 \ll 1$ holds and a power of Po such as $Po^2$ or $Po^3$ is negligible. When the total number of optical paths corresponding to a new channel is assumed to be "n" (n is an integer equal to or more than 1), the relation indicated by expression (4) below is established. If $Po = 1.0 \times 10^{-5}$, $Po^2 = 1.0 \times 10^{-10} \ll 1$ holds.

$$Pa = 1 - nPo \quad (4)$$

The converter 32 calculates outage Po for each optical path corresponding to the new path using expression (4) above based on availability Pa of the SLA.

Figure 3:
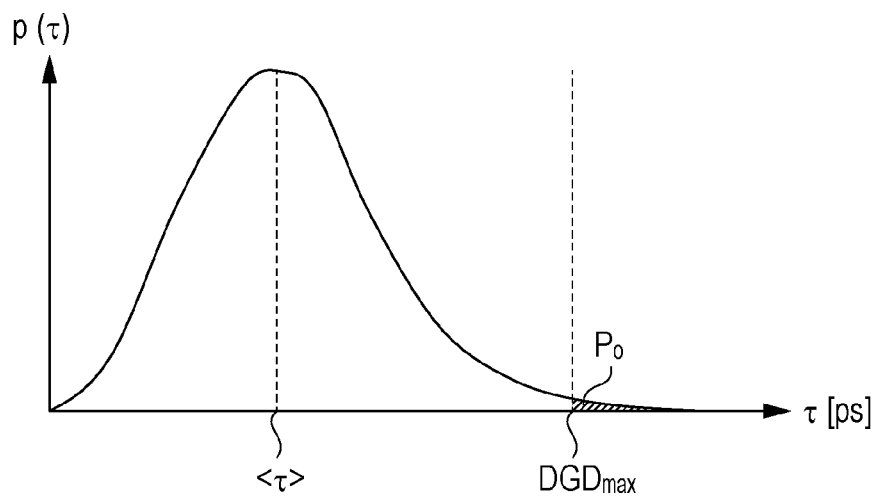
FIG. 3 illustrates an example of the distribution of DGDs.

Then, the converter 32 calculates DGD maximum value DGDmax using expressions (5) and (6) below based on outage Po. An example of the distribution of DGD is illustrated in FIG. 3.

$$p_o = 1 - \int_0^{DGD_{max}} p(\tau) d\tau \quad (5)$$

$$p(\tau) = 32 \frac{\tau^2}{\pi^2 \langle \tau \rangle^3} \exp\left(-\frac{4\tau^2}{\pi \langle \tau \rangle^2}\right) \quad (6)$$

where
$\tau$ = Differential group delay (DGD)<
$\langle\tau\rangle$ = DGD (mean) (average of DGD)

Figure 4:
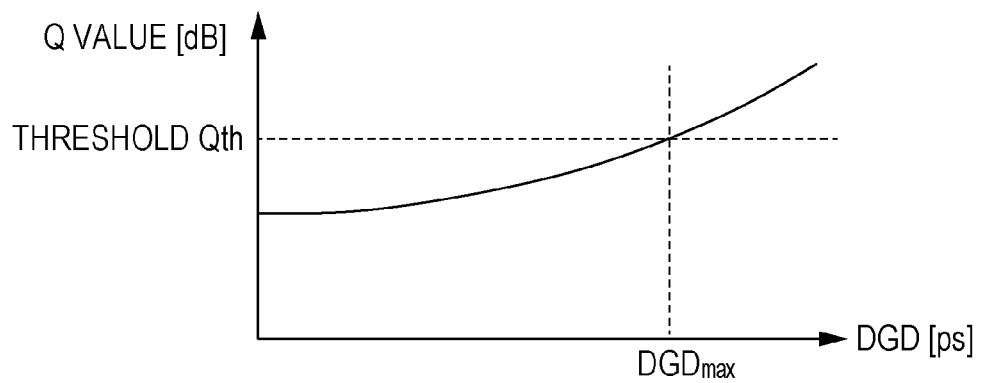
FIG. 4 illustrates an example of a DGD/Q value correspondence table.

Then, the converter 32 calculates threshold Qth based on maximum value DGDmax of DGD. For example, the converter 32 holds a DGD/Q value correspondence table as depicted in FIG. 4 in which correspondence between DGDs and Q values are indicated. FIG. 4 illustrates an example of a DGD/Q value correspondence table. The converter 32 calculates threshold Qth by reading the Q value corresponding to maximum value DGDmax of DGD from the DGD/Q value correspondence table. A DGD/Q value correspondence table is created in advance through simulation depending on the signal type of WDM optical signal to be transmitted. In this manner, the converter 32 converts availability Pa of the SLA acquired by the acquisition unit 31 into a threshold Qth of the Q values that has to be satisfied by channels in the WDM optical signal.

The determination unit 33 calculates the Q values of the channels based on the optical power of channels in the WDM optical signal adjusted by the WSS with adjustment function 24 in the optical transmission device 2 to be adjusted. Then, the determination unit 33 determines the adjustment amount to be set for the transparency properties of the WSS with adjustment function 24 in the optical transmission device 2 to be adjusted, so that the calculated Q value satisfies threshold Qth. More specifically, the determination unit 33 determines the adjustment amount so that the calculated Q value satisfies threshold Qth when the delay acquired by the acquisition unit 31 as the SLA is "Premium", which indicates the shortest time.

Here, an example of processing for determining the adjustment amount in embodiment 1 will be described. First, the determination unit 33 acquires the monitoring information of channels in the WDM optical signal via an optical monitoring channel such as an optical supervisory channel (OSC) established with each optical transmission device 2. The monitoring information includes the optical power of channels in the WDM optical signal adjusted by the WSS with adjustment function 24 in the optical transmission device 2 to be adjusted and the noise coefficients corresponding to channels in the WDM optical signal.

Then, the determination unit 33 calculates the Q values of channels in the WDM optical signal using expressions (7) to (9) below, based on the optical power and the noise coefficients of channels in the WDM optical signal. The calculated Q values become the Q values of decision targets with respect to threshold Qth.

$$Q \text{ value[dB]} = OSNR_{total} + (OSNR/Q \text{ conversion coefficient}) - (\text{Transmission penalty}) \quad (7)$$

where the OSNR/Q conversion coefficient and Transmission penalty are predetermined design values.

$$OSNR_{total}[dB] = -10 \log(\Sigma_{i-1}^{n}(10^{-OSNR(i)/10})) \quad (8)$$

where n is the total number of optical transmission paths in the optical path.

$$OSNR(i)[dB] = \text{AmpInputPower} - \text{Amp}NF + \text{Const} \quad (9)$$

where
AmpInputPower: Optical power of channels in the WDM optical signal

AmpNF: Noise index
Const: Predetermined design value

Then, the determination unit 33 decides whether the Q values (that is, the Q values of determination targets) of channels in the WDM optical signal satisfy threshold Qth. If the Q values of decision targets satisfy threshold Qth, the determination unit 33 decides the transmission quality to be good and does not determine an adjustment amount. In contrast, if the Q values of determination targets do not satisfy threshold Qth, the determination unit 33 decides the transmission quality to be bad and decides whether the delay acquired as the SLA is "Premium", which indicates the shortest time. If the delay acquired as the SLA is "Premium", the determination unit 33 determines the adjustment amount to be set for the optical transmission devices 2 to be adjusted so that the Q value of the decision target satisfies the threshold Qth.

Figure 5A:
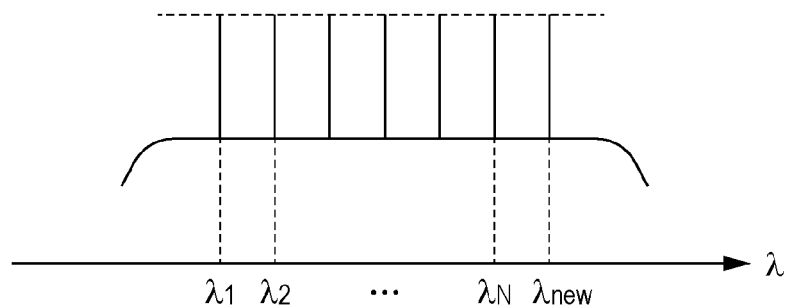
FIGS. 5A to 5C illustrate an example of processing for determining an adjustment amount in embodiment 1.
Figure 5B:
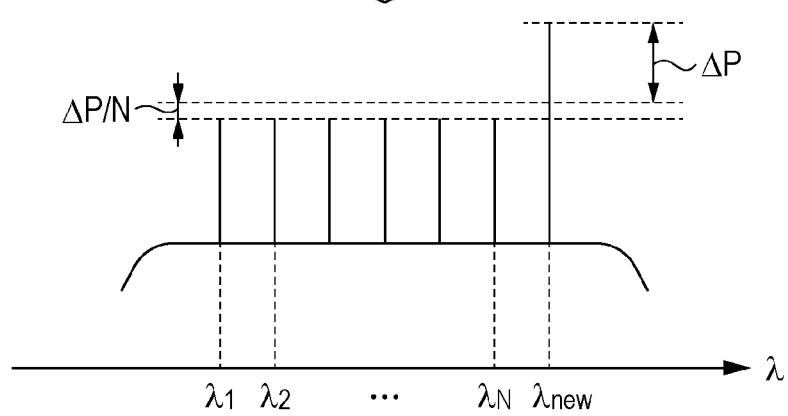
Figure 5C:
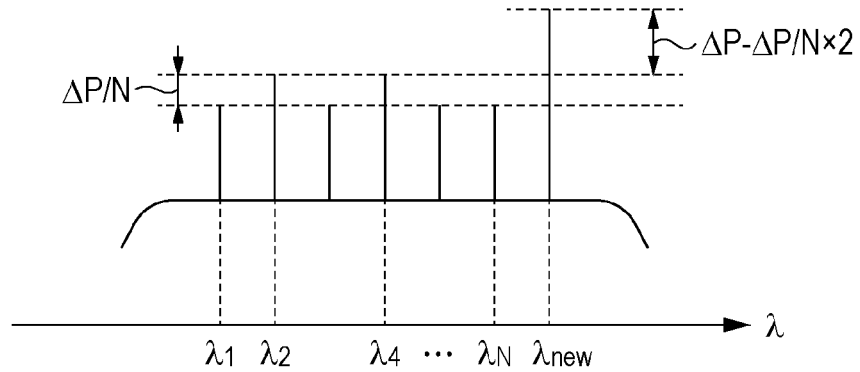

FIGS. 5A to 5C illustrate an example of processing for determining the adjustment amount in embodiment 1. In FIGS. 5A to 5C, the channel corresponding to wavelength $\lambda_{new}$ is a new channel for which an SLA is newly set and the channels corresponding to wavelengths $\lambda_1$ to $\lambda_N$ are existing channels for which an SLA has already been set. FIG. 5A indicates the state in which the adjustment amount to be set for the optical transmission device 2 to be adjusted has not been determined yet.

If the Q value of a new channel among the Q values of channels in the WDM optical signal does not satisfy threshold Qth, the determination unit 33 determines an adjustment amount as depicted in FIG. 5B. That is, the determination unit 33 determines a temporary adjustment amount (referred to below as a first adjustment amount) that increases the optical power of a new channel by increase amount ΔP and reduces the optical power of the existing channels by reduction amount ΔP/N, which is obtained by dividing increase amount ΔP by the total number N of existing channels. As a result, the transparency properties of the WSS with adjustment function 24 in the optical transmission device 2 to be adjusted are changed so that the attenuation amount of the new channel becomes small and the attenuation amount of the existing channels becomes large, based on the first adjustment amount.

In addition, if the Q value of at least one channel among existing channels does not satisfy threshold Qth after determining the first adjustment amount, the determination unit 33 newly determines an adjustment amount. That is, the determination unit 33 determines a temporary adjustment amount (referred to below as a second adjustment amount) that increases the optical power of the existing channel not satisfying threshold Qth by reduction amount ΔP/N and reduces the optical power of a new channel by the total number of new channels multiplied by reduction amount ΔP/N. It is assumed that, for example, the Q values of two existing channels corresponding to wavelengths $\lambda_2$ and $\lambda_4$ among a plurality of existing channels corresponding to wavelengths $\lambda_1$ to $\lambda_N$ depicted in FIG. 5A do not satisfy threshold Qth. In this case, the determination unit 33 newly determines the second adjustment amount that increases the optical power of the two existing channels by reduction amount ΔP/N and reduces the optical power of the new channel by total number (2) of the two existing channels multiplied by ΔP/N, as depicted in FIG. 5C.

The determination unit 33 decides that the transmission quality is improved when the Q values of all channels in the WDM optical signal including the new channel and existing channels satisfies threshold Qth after determination of temporary adjustment amounts such as the first adjustment amount and the second adjustment amount. Then, the determination unit 33 determines a temporary adjustment amount as the adjustment amount to be set for the optical transmission device 2 to be adjusted. Then, the determination unit 33 sets the determined adjustment amount for the optical transmission device 2 to be adjusted through a LAN or the like.

Upon receiving the adjustment amount from the management device 3 through a LAN or the like, the controller 26 in the optical transmission device 2 adjusts the transparency properties of the WSS with adjustment function 24 based on the adjustment amount. The WSS with adjustment function 24 adjusts the optical power of channels in the WDM optical signal so that the Q values of channels in the WDM optical signal satisfy threshold Qth and outputs the adjusted WDM optical signal. As a result, the quality of services provided using channels in the WDM optical signal individually satisfies the SLA, which are different between channels in the WDM optical signal.

Figure 6:
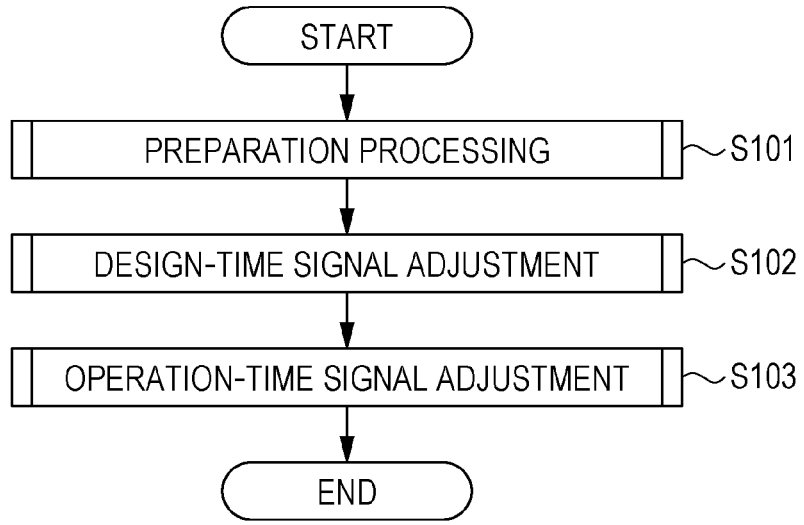
FIG. 6 is a flowchart depicting an example of the entire processing of the optical transmission system according to embodiment 1.

Next, the operation of the optical transmission system 1 according to embodiment 1 will be described. FIG. 6 is a flowchart depicting an example of the entire processing of the optical transmission system according to embodiment 1. In the entire processing depicted in FIG. 6, the management device 3 sets the adjustment amount for the optical transmission device 2 to be adjusted when the transmission quality of the existing channel among channels in the WDM optical signal for which an SLA is newly set does not satisfy threshold Qth.

In such a way as described in FIG. 6, the optical transmission system 1 carries out preparation processing such as acquisition of an SLA to be newly set in the new channel (operation S101). Then, the optical transmission system 1 carries out design-time signal adjustment in which an adjustment amount is set for the optical transmission device 2 to be adjusted, during design of the optical transmission system 1 (operation S102). Then, the optical transmission system 1 carries out operation-time signal adjustment in which the adjustment amount is set for optical transmission device 2 to be adjusted, during operation of the optical transmission system 1 (operation S103). Preparation processing, design-time signal adjustment, and operation-time signal adjustment will be described in detail below in sequence.

Figure 7:
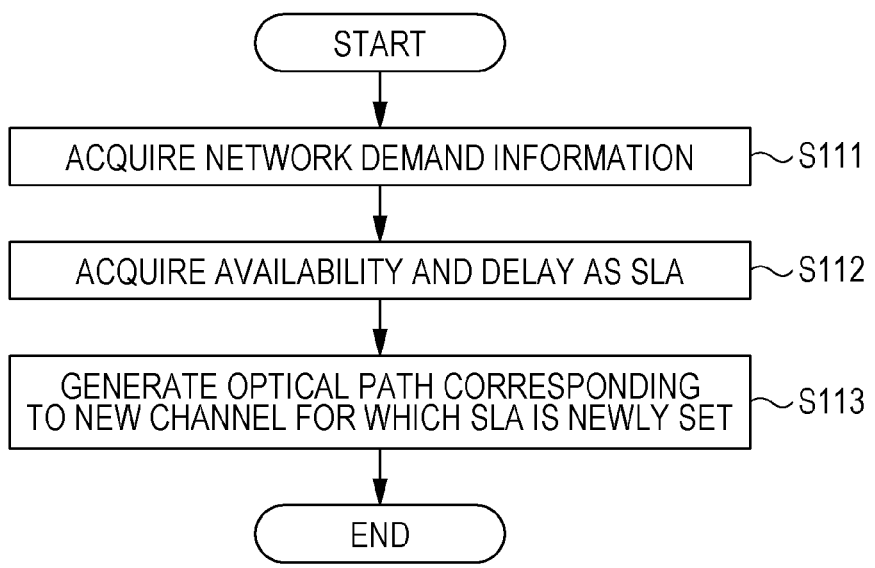
FIG. 7 is a flowchart depicting an example of preparation processing of the optical transmission system according to embodiment 1.

First, preparation processing depicted in operation S101 in FIG. 6 will be described in detail. FIG. 7 is a flowchart depicting an example of preparation processing of the optical transmission system according to embodiment 1. Preparation processing depicted in FIG. 7 corresponds to operation S101 depicted in FIG. 6. As depicted in FIG. 7, the management device 3 acquires network demand information from an input unit (not depicted) such as a user interface (operation S111). Network demand information includes information of combination of a pair of optical transmission devices 2 requested by the user, which are the transmission source and the transmission destination of the WDM optical signal, the signal types of the WDM optical signal, and so on.

The acquisition unit 31 of the management device 3 acquires availability Pa and delay as an SLA using an input unit such as a user interface (operation S112). For example, the acquisition unit 31 acquires availability Pa and delay in relation to information of combination of a pair of optical transmission devices 2, which are the transmission source and the transmission destination of the WDM optical signal in network demand information, and information of the signal type of the WDM optical signal. The delay is one of "Premium", "Normal", and "Best effort".

Figure 8:
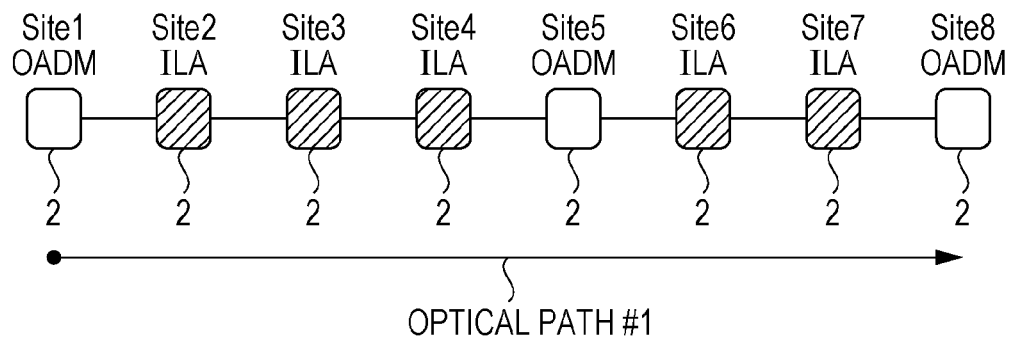
FIG. 8 illustrates an example of generation of an optical path corresponding to a new channel.

The management device 3 generates an optical path corresponding to the new channel for which an SLA is newly set based on network demand information (operation S113). An example of generation of an optical path corresponding to the new channel is illustrated in FIG. 8. In the example in FIG. 8, it is assumed that network demand information specifies the optical transmission device 2 that is OADM of Site1 to be the transmission source of the WDM optical signal and the optical transmission device 2 that is OADM of Site8 to be the transmission destination of the WDM optical signal. In this case, the management device 3 generates optical path #1 that connects between the optical transmission device 2 that is OADM of Site1 and the optical transmission device 2 that is OADM of Site8. Optical path #1 includes two OADM sections. One of the two OADM sections ranges from the optical transmission device 2 that is OADM of Site1 to the optical transmission device 2 that is OADM of Site5. The other of the two OADM sections ranges from the optical transmission device 2 that is OADM of Site5 to the optical transmission device 2 that is OADM of Site8.

Figure 9:
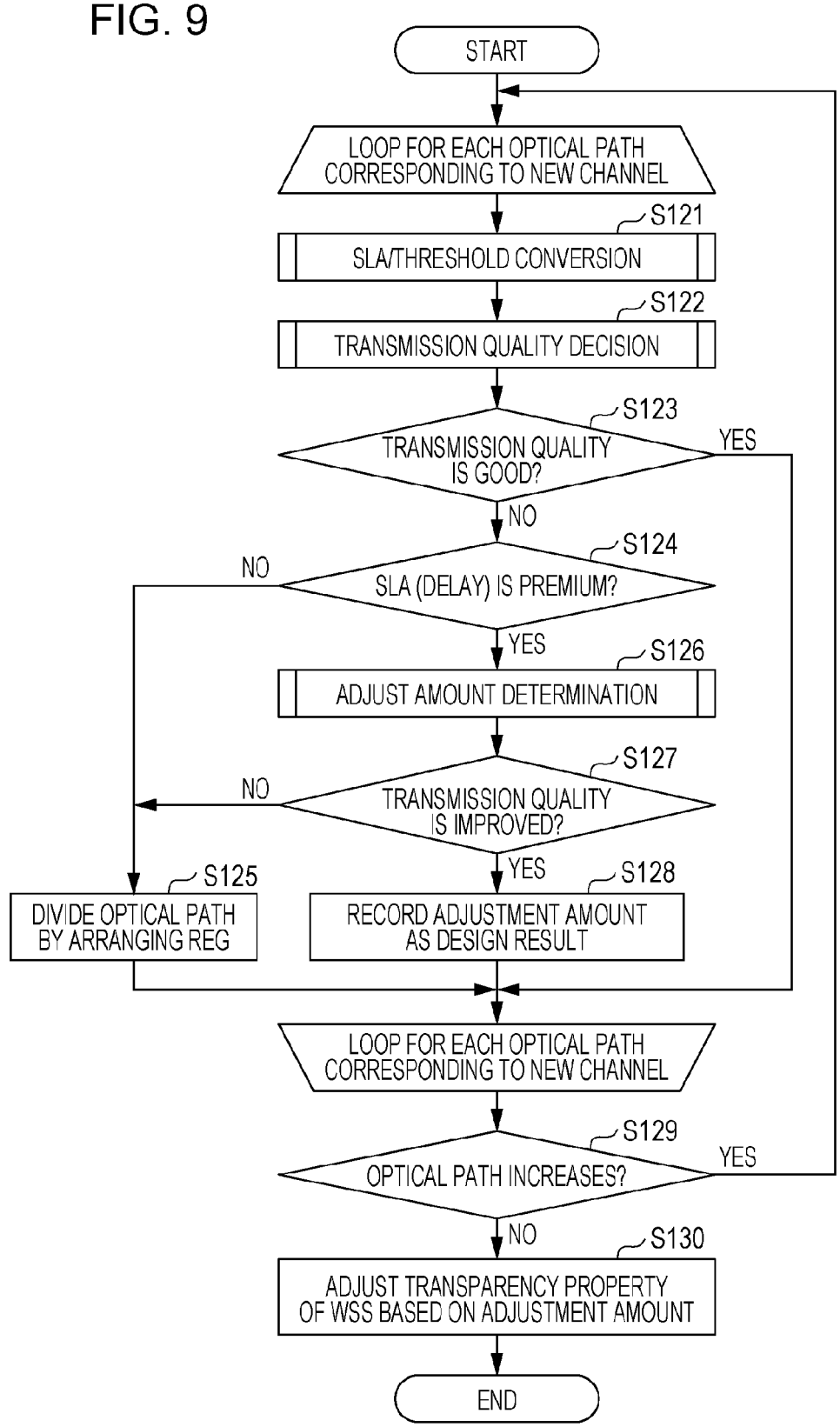
FIG. 9 is a flowchart depicting an example of design-time signal adjustment of the optical transmission system according to embodiment 1.

Next, design-time signal adjustment in operation S102 of FIG. 6 will be described in detail. FIG. 9 is a flowchart depicting an example of design-time signal adjustment of the optical transmission system according to embodiment 1. Design-time signal adjustment depicted in FIG. 9 corresponds to operation S102 depicted in FIG. 6. As described in FIG. 9, the converter 32 of the management device 3 performs SLA/threshold conversion, which converts an SLA to threshold Qth (operation S121).

Figure 10:
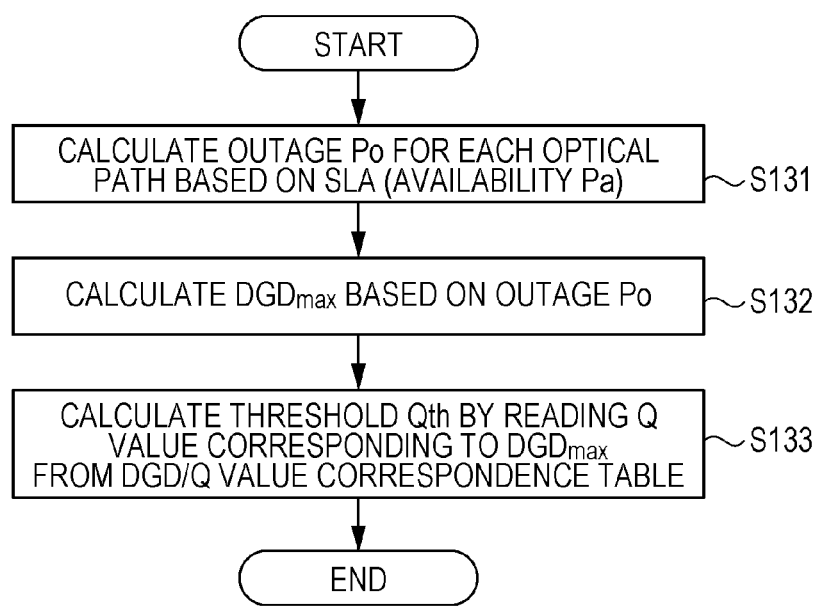
FIG. 10 is a flowchart depicting an example of SLA/threshold conversion of the optical transmission system according to embodiment 1.

An example of SLA/threshold conversion in operation S121 will be described with reference to FIG. 10. FIG. 10 is a flowchart depicting an example of SLA/threshold conversion the optical transmission system according to embodiment 1.

As described in FIG. 10, the converter 32 of the management device 3 calculates outage Po for each of the optical paths corresponding to channels in the WDM optical signal, based on availability Pa of the SLA (operation S131). The converter 32 calculates maximum value DGDmax of DGD based on outage Po (operation S132). The converter 32 calculates threshold Qth by reading the Q value corresponding to maximum value DGDmax of DGD from the DGD/Q value correspondence table (operation S133). The DGD/Q value correspondence table is different depending on the signal type of the WDM optical signal to be transmitted.

Returning to the description of FIG. 9, the determination unit 33 of the management device 3 performs transmission quality decision for deciding the transmission quality by using threshold Qth acquired through SLA/threshold conversion (operation S122).

Figure 11:
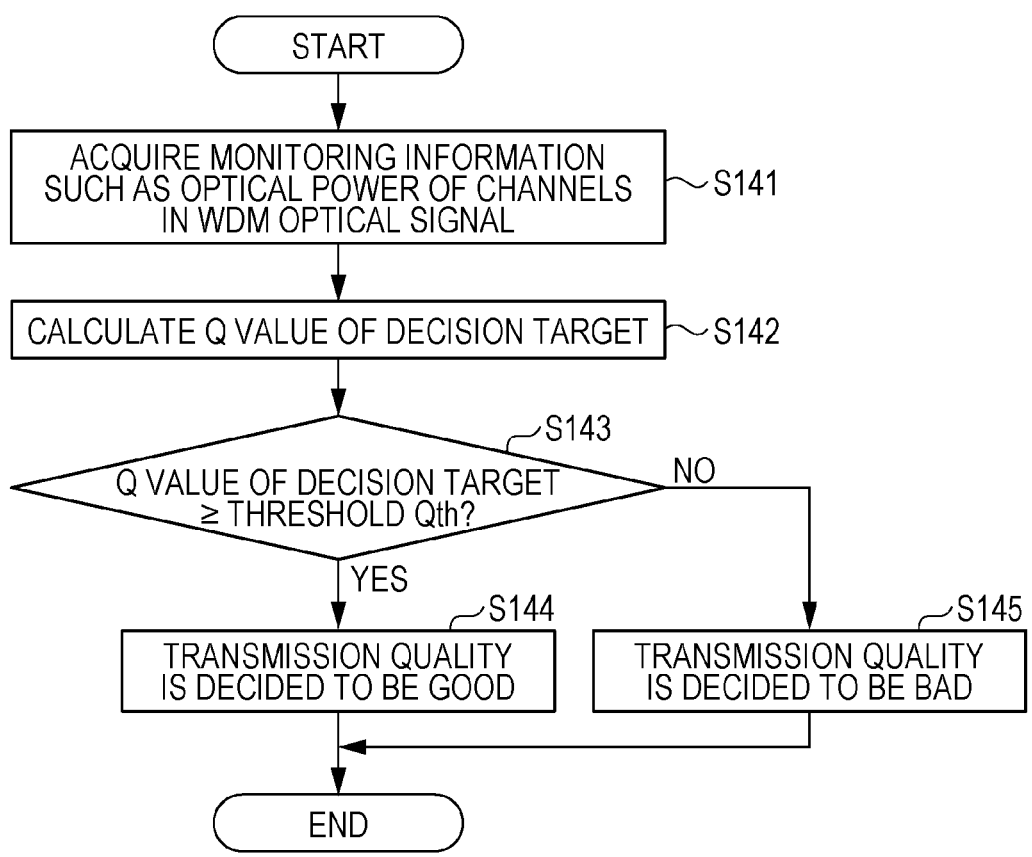
FIG. 11 is a flowchart depicting an example of transmission quality decision of the optical transmission system according to embodiment 1.

An example of transmission quality decision in operation S122 will be described with reference to FIG. 11. FIG. 11 is a flowchart depicting an example of transmission quality decision of the optical transmission system according to embodiment 1.

As described in FIG. 11, the determination unit 33 of the management device 3 acquires monitoring information such as the optical power of each of channels in the WDM optical signal via an optical monitoring channel such as an OSC (operation S141). The determination unit 33 calculates the Q values of channels in the WDM optical signal (that is, the Q values of decision targets) based on the optical power and noise coefficient of channels in the WDM optical signal (operation S142).

The determination unit 33 decides whether the Q values of decision targets satisfy threshold Qth (operation S143). If the Q values of decision targets satisfy threshold Qth (Yes in operation S143), the determination unit 33 decides the transmission quality to be good (operation S144). In contrast, if the Q values of decision targets do not satisfy threshold Qth (No in operation S143), the determination unit 33 decides the transmission quality to be bad (operation S145).

Returning to the description of FIG. 9, if the transmission quality is good (Yes in operation S123), the determination unit 33 lets the processing proceed to operation S129 without determining an adjustment amount.

In contrast, if the transmission quality is bad (No in operation S123), the determination unit 33 determines whether the delay acquired as the SLA is "Premium" (operation S124).

If the delay acquired as the SLA is not "Premium" (No in operation S124), the determination unit 33 divides the optical path of the new channel by arranging a regenerator (REG) on the optical path of the new channel (operation S125). The REG may be arranged using a method bisecting distance, a method bisecting the number of spans, or other existing methods.

In contrast, the delay acquired as the SLA is "Premium" (Yes in operation S124), the determination unit 33 performs adjust amount determination, which determines the adjustment amount, so that the Q value of a decision target satisfies threshold Qth (operation S126).

Figure 12:
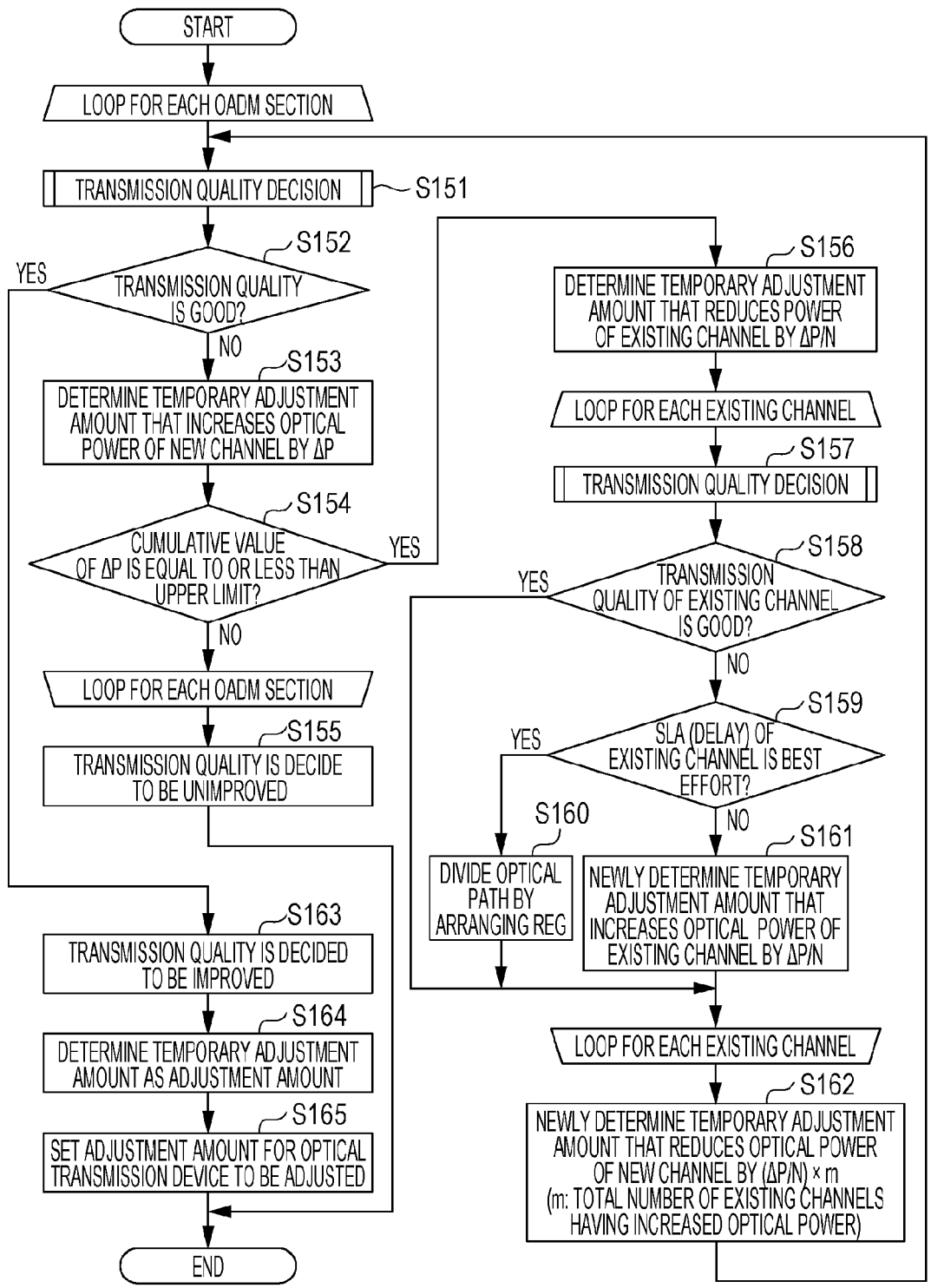
FIG. 12 is a flowchart depicting an example of adjustment amount determination of the optical transmission system according to embodiment 1.

An example of transmission quality decision in operation S126 will be described with reference to FIG. 12. FIG. 12 is a flowchart depicting an example of t adjustment amount determination of the optical transmission system according to embodiment 1.

As depicted in FIG. 12, the determination unit 33 of the management device 3 performs transmission quality decision (operation S151). Since the transmission quality decision in operation S151 corresponds to the transmission quality decision that was already described with reference to FIG. 11, its detailed description is omitted here.

If the Q value of the new channel among the Q values of channels in the WDM optical signal satisfies threshold Qth, that is, if the transmission quality of the new channel is good (Yes in operation S152), the determination unit 33 lets the processing proceed to operation S163.

In contrast, if the Q value of the new channel among the Q values of channels in the WDM optical signal does not satisfy threshold Qth, that is, when the transmission quality of the new channel is bad (No in operation S152), the determination unit 33 performs the following processing. That is, the determination unit 33 determines a temporary adjustment amount that increases the optical power of the new channel by increase amount $\Delta P$ (operation S153).

If the cumulative value of increase amount $\Delta P$ exceeds a predetermined upper limit (No in operation S154), the determination unit 33 decides that an increase in the adjustment amount does not improve the transmission quality (operation S155) and ends the processing.

In contrast, if the cumulative value of increase amount $\Delta P$ is equal to or less than the predetermined upper limit (Yes in operation S154), the determination unit 33 determines the amount of temporary adjustment in which the optical power of existing channels is reduced by $\Delta P/N$ (operation S156). That is, the determination unit 33 determines a first adjustment amount that increases the optical power of the new channel by increase amount $\Delta P$ and reduces the optical power of existing channels by reduction amount $\Delta P/N$.

The determination unit 33 performs transmission quality decision (operation S157). Since the transmission quality decision in operation S151 corresponds to the transmission quality decision that was already described with reference to FIG. 11, its detailed description is omitted here.

If the Q values of existing channels among the Q values of channels in the WDM optical signal satisfy threshold Qth, that is, if the transmission quality of the existing channels is good (Yes in operation S158), the determination unit 33 lets the processing proceed to operation S162.

In contrast, if the transmission quality of existing channels is bad (No in operation S158), the determination unit 33 determines whether the delay acquired as the SLA of the existing channels is "Best effort" (operation S159).

If the delay acquired as the SLA of existing channels is "Best effort" (Yes in operation S159), the determination unit 33 divides the optical path of the existing channels by arranging a REG on the optical path of the existing channels (operation S160).

In contrast, if the delay acquired as the SLA of the existing channels is not "Best effort" (No in operation S159), the determination unit 33 performs the following processing. That is, the determination unit 33 newly determines a temporary adjustment amount that increases the optical power of the existing channels not satisfying threshold Qth among existing channels by reduction amount $\Delta P/N$ (operation S161).

The determination unit 33 newly determines a temporary adjustment amount that reduces the optical power of the new channel by $(\Delta P/N) \times m$ obtained by multiplying the total number of existing channels by reduction amount $\Delta P/N$ (operation S162) and returns the processing to operation S151. That is, after determining the first adjustment amount, the determination unit 33 determines the second adjustment amount that increases the optical power of the existing channels not satisfying threshold Qth by $\Delta P/N$ and reduces the optical power of the existing channels by $(\Delta P/N)$ multiplied by the total number of existing channels.

In operation S163, the transmission quality of the new channel is good, so the determination unit 33 decides that the transmission quality is improved (operation S163). Then, the determination unit 33 determines temporary adjustment amounts such as the first adjustment amount and the second adjustment amount as the adjustment amounts to be set for the optical transmission device 2 to be adjusted (operation S164). Then, the determination unit 33 sets the determined adjustment amount for the optical transmission device 2 to be adjusted through a LAN or the like (operation S165).

Returning to the description of FIG. 9, if the transmission quality is not improved by adjustment amount determination (No in operation S127), the determination unit 33 lets the processing proceed to operation S125.

In contrast, if the transmission quality is improved by adjustment amount determination (Yes in operation S127), the determination unit 33 records the adjustment amount in an internal memory or the like as the design result (operation S128).

Then, if the path of the new channel increases (Yes in operation S129), the determination unit 33 returns the processing to operation S121. If the path of the new channel does not increase (No in operation S129), the determination unit 33 lets the processing proceed to operation S130.

The controller 26 of the optical transmission device 2 to be adjusted adjusts the transparency properties of the WSS with adjustment function 24 based on an adjustment amount set by the management device 3 (operation S130) and ends design-time signal adjustment. As a result, the WSS with adjustment function 24 adjusts the optical power of channels in the WDM optical signal so that the Q values of channels in the WDM optical signal satisfy threshold Qth and outputs the adjusted WDM optical signal.

Figure 13:
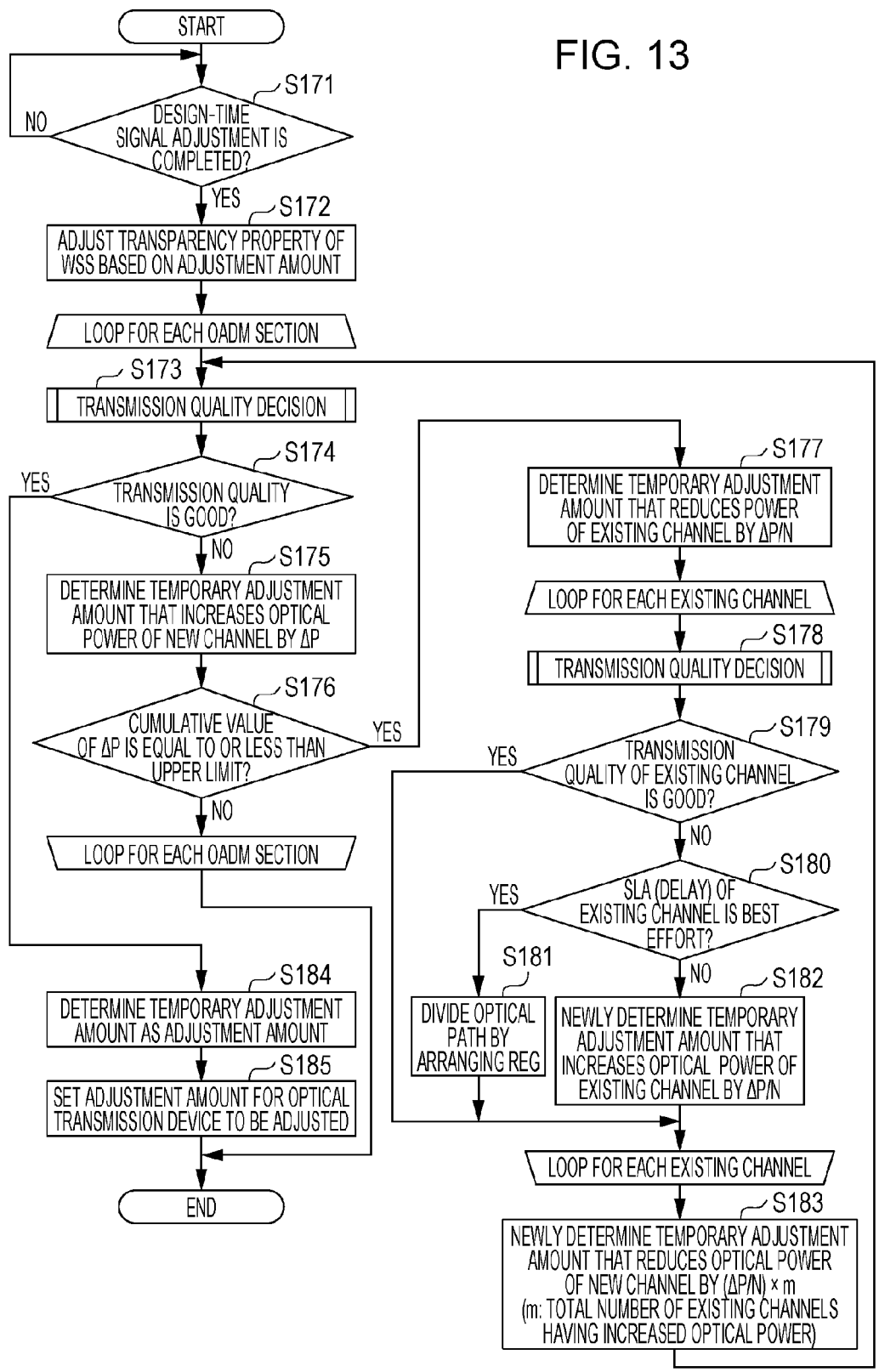
FIG. 13 is a flowchart depicting an example of operation-time signal adjustment of the optical transmission system according to embodiment 1.

Next, operation-time signal adjustment depicted in operation S103 of FIG. 6 will be described. FIG. 13 is a flowchart depicting an example of operation-time signal adjustment of the optical transmission system according to embodiment 1.

As depicted in FIG. 13, upon completion of design-time signal adjustment (Yes in operation S171), the controller 26 of the optical transmission device 2 to be adjusted adjusts the transparency properties of the WSS with adjustment function 24 continuously based on the adjustment amount set by the management device 3 (operation S172).

The determination unit 33 of the management device 3 performs transmission quality decision (operation S173). Since the transmission quality decision in operation S173 corresponds to the transmission quality decision that was already described with reference to FIG. 11, its detailed description is omitted here.

If the Q value of the new channel among the Q values of channels in the WDM optical signal satisfies threshold Qth, that is, if the transmission quality of the new channel is good (Yes in operation S174), the determination unit 33 lets the processing proceed to operation S184.

In contrast, if the Q value of the new channel among the Q values of channels in the WDM optical signal does not satisfy threshold Qth, that is, when the transmission quality of the new channel is bad (No in operation S174), the determination unit 33 performs the following processing. That is, the determination unit 33 determines a temporary adjustment amount that increases the optical power of the new channel by increase amount $\Delta P$ (operation S175).

If the cumulative value of increase amount $\Delta P$ exceeds a predetermined upper limit (No in operation S176), the determination unit 33 ends operation-time signal adjustment.

In contrast, if the cumulative value of increase amount $\Delta P$ is equal to or less than the predetermined upper limit (Yes in operation S176), the determination unit 33 determines a temporary adjustment amount that reduces the optical power of existing channels by $\Delta P/N$ (operation S177). That is, the determination unit 33 determines the first adjustment amount that increases the optical power of the new channel by increase amount $\Delta P$ and reduces the optical power of existing channels by reduction amount $\Delta P/N$.

The determination unit 33 performs transmission quality decision (operation S178). Since the transmission quality decision in operation S178 corresponds to the transmission quality decision that was already described with reference to FIG. 11, its detailed description is omitted here.

If the Q values of existing channels among the Q values of channels in the WDM optical signal satisfy threshold Qth, that is, if the transmission quality of the existing channels is good (Yes in operation S179), the determination unit 33 lets the processing proceed to operation S183.

In contrast, when the transmission quality of existing channels is bad (No in operation S179), the determination unit 33 determines whether the delay acquired as the SLA of the existing channels is "Best effort" (operation S180).

If the delay acquired as the SLA of the existing channels is "Best effort" (Yes in operation S180), the determination unit 33 divides the optical paths of the existing channels by arranging a REG on the optical paths of the existing channels (operation S181).

In contrast, if the delay acquired as the SLA of the existing channels is not "Best effort" (No in operation S180), the determination unit 33 performs the following processing. That is, the determination unit 33 newly determines a temporary adjustment amount that increases the optical power of the existing channels not satisfying threshold Qth among existing channels by reduction amount $\Delta P/N$ (operation S182).

The determination unit 33 newly determines a temporary adjustment amount that reduces the optical power of the new channel by $(\Delta P/N) \times m$ obtained by multiplying the total number m of existing channels by reduction amount $\Delta P/N$ (operation S183) and returns the processing to operation S173. That is, after determination of the first adjustment amount, if the Q value of the existing channel does not satisfy threshold Qth, the determination unit 33 determines the second adjustment amount that increases the optical power of the existing channels not satisfying threshold Qth by reduction amount ΔP/N and reduces the optical power of the new channel by the total number of existing channels multiplied by reduction amount ΔP/N.

In operation S184, the determination unit 33 determines temporary adjustment amounts such as the first adjustment amount and the second adjustment amount as the adjustment amounts to be set for the optical transmission device 2 to be adjusted (operation S184). Then, the determination unit 33 sets the determined adjustment amounts for the optical transmission device 2 to be adjusted through a LAN or the like (operation S185).

As described above, in embodiment 1, the management device 3 converts an SLA into a threshold Qth of the Q values that has to be satisfied by channels in the WDM optical signal and determines an adjustment amount to be set for the transparency properties of the WSS with adjustment function 24 of optical transmission devices 2 to be adjusted so that the Q values of the channels satisfy threshold Qth. Accordingly, the WSS with adjustment function 24 of the optical transmission devices 2 to be adjusted adjusts the optical power of channels in the WDM optical signal so that the Q values of channels in the WDM optical signal satisfy threshold Qth and is able to output the adjusted WDM optical signal. As a result, according to embodiment 1, it is possible to adjust the transmission quality of the channels in the WDM optical signal on an autonomous basis depending on the SLA.

The management device 3 according to embodiment 1 converts availability Pa acquired as the SLA into threshold Qth and, when the delay acquired as the SLA indicate the shortest time, determines an adjustment value so that the Q values of channels in the WDM optical signal satisfy threshold Qth. As a result, according to embodiment 1, it is possible to adjust the transmission quality of the channels in the WDM optical signal on an autonomous basis depending on availability Pa and delay of a plurality of evaluation values included in the SLA.

If the Q value of the new channel for which an SLA is newly set does not satisfy threshold Qth, the management device 3 according to embodiment 1 determines the first adjustment amount, as an adjustment amount, that increases the optical power of the new channel and reduces the optical power of existing channels. As a result, in embodiment 1, the optical power of the existing channels is evenly reduced and the transmission quality of the new channel in the WDM optical signal is improved.

If the Q values of existing channels do not satisfy threshold Qth after determination of the first adjustment amount, the management device 3 according to embodiment 1 determines the second adjustment amount, as an adjustment amount, that increases the optical power of the existing channels and reduces the optical power of the new channel. As a result, in embodiment 1, it is possible to improve the transmission quality of new channel in the WDM optical signal while keeping the transmission quality of existing channels in the WDM optical signal so that the SLA is satisfactory.

Figure 14:
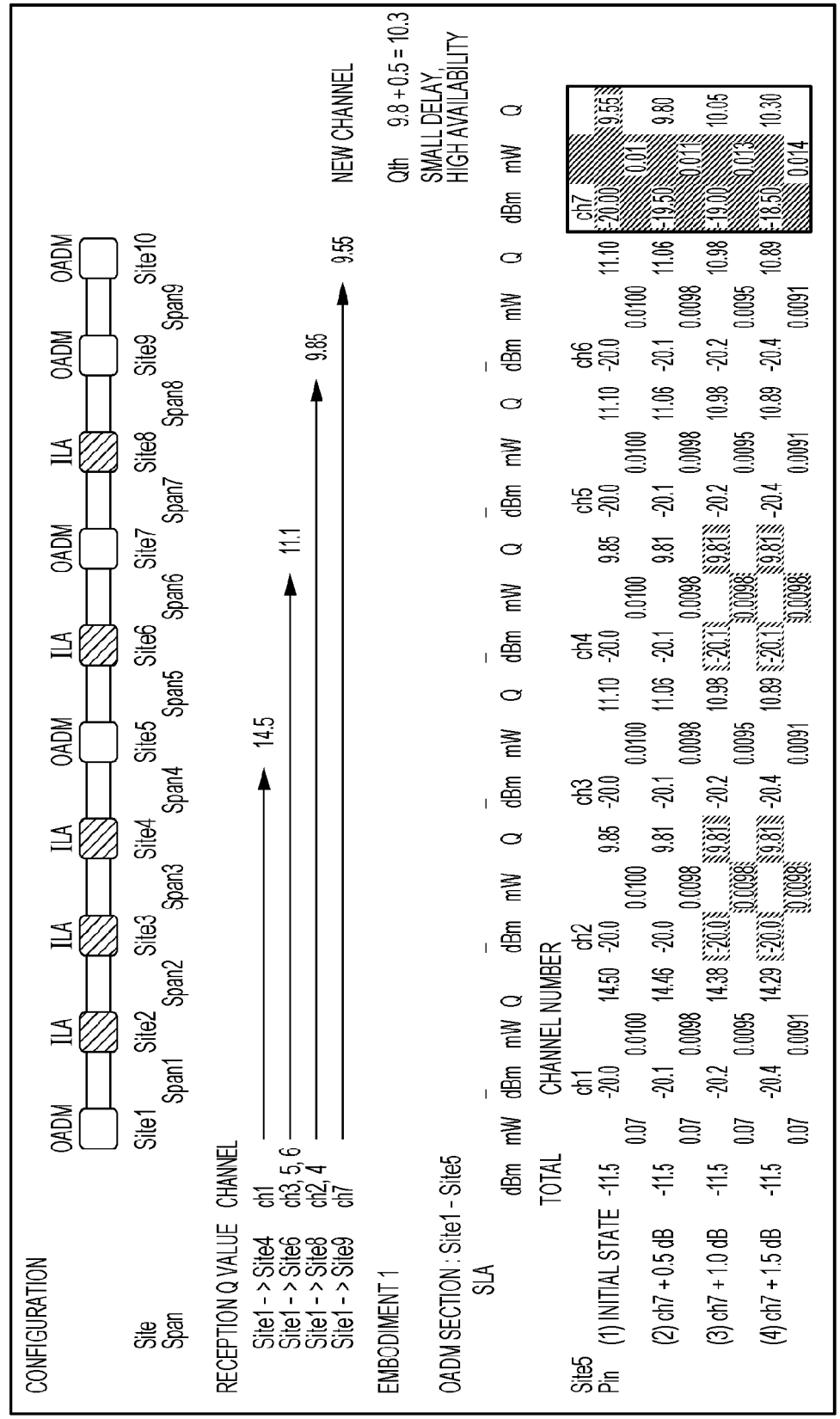
FIG. 14 illustrates an example of adjusting the transmission quality of channels in WDM optical signal in embodiment 1.

An example of adjusting the transmission quality of channels in the WDM optical signal according to embodiment 1 will be described. FIG. 14 illustrates an example of adjusting the transmission quality of channels in a WDM optical signal in embodiment 1. In the example depicted in FIG. 14, channel 7 (ch7) is the new channel for which an SLA is newly set and channels 1 to 6 (ch1 to ch6) are existing channels for which an SLA has been set. An SLA including an availability of 99.999% and a delay of "Premium" has been set for channel 7. Since the management device 3 converted the SLA into threshold Qth, threshold Qth of channel 7 became 10.3 dB. The Q values of channels in the WDM optical signal became 14.5 dB (ch1), 11.1 dB (ch3, ch5, and ch6), 9.85 dB (ch2 and ch4), and 9.55 dB (ch7) in the initial state.

In the initial state depicted in FIG. 14, the Q value (9.55 dB) of channel 7 in the WDM optical signal does not satisfy threshold Qth (10.3 dB) of the channel 7. Accordingly, the management device 3 sets, for the transparence properties of the WSS with adjustment function 24 of the optical transmission devices 2 to be adjusted, an adjustment amount that increases the optical power of the new channel ch7 by 0.5 dB three times and reduces the optical power of the existing channels ch1 to ch6. At this time, the optical power of channels 2 and 4 is kept so that the Q value becomes more than the threshold. Accordingly, the Q value of channel 7 in the WDM optical signal reaches threshold Qth (10.3 dB) from 9.55 dB. This improves the transmission quality of the new channel ch7 in the WDM optical signal.

Embodiment 2

Embodiment 1 above depicts an example of determining an adjustment amount that increases the optical power of the new channel and reduces the optical power of existing channels evenly if the Q value of the new channel for which an SLA is newly set does not satisfy threshold Qth. However, if the Q value of the new channel for which an SLA is newly set does not satisfy threshold Qth, it may be possible to determine the adjustment amount that reduces the optical power of the existing channels having the maximum difference of transmission quality from threshold Qth. Accordingly, embodiment 2 depicts an example of determining the adjustment amount that the optical power of the existing channels having the maximum difference from threshold Qth if the Q value of the new channel for which an SLA is newly set does not satisfy threshold Qth.

FIG. 15 illustrates an example of the structure of an optical transmission device and the structure of a management device in an optical transmission system according to embodiment 2. The same components as in the optical transmission system 1 according to embodiment 1 are given the same reference characters to omit the description of the duplicate components and operation. The management device 3a depicted in FIG. 15 includes the determination unit 33a in place of the determination unit 33 depicted in FIG. 2.

The determination unit 33a calculates the Q values of the channels based on the optical power of channels in the WDM optical signal adjusted by the WSS with adjustment function 24 in the optical transmission device 2 to be adjusted. Then, the determination unit 33a determines the adjustment amount to be set for the transparency properties of the WSS with adjustment function 24 in the optical transmission devices 2 to be adjusted, so that the calculated Q value satisfies threshold Qth. More specifically, the determination unit 33a determines the adjustment amount so that the calculated Q value satisfies threshold Qth when the delay acquired by the acquisition unit 31 as an SLA is "Premium", which indicates the shortest time.

Here, an example of processing for determining the adjustment amount in embodiment 2 will be described. First, the determination unit 33a acquires the monitoring information of channels in the WDM optical signal via an optical monitoring channel such as an optical supervisory channel (OSC)

established with each optical transmission device 2. The monitoring information includes the optical power of channels in the WDM optical signal adjusted by the WSS with adjustment function 24 in the optical transmission device 2 to be adjusted and the noise coefficients corresponding to channels in the WDM optical signal.

Then, the determination unit 33a calculates the Q values of channels in the WDM optical signal using expressions (7) to (9) above, based on the optical power and the noise coefficients of channels in the WDM optical signal. The calculated Q values become the Q values of decision targets with respect to threshold Qth.

Then, the determination unit 33a decides whether the Q values of channels (that is, the Q values of decision targets) in the WDM optical signal satisfy threshold Qth. If the Q values of decision targets satisfy threshold Qth, the determination unit 33a decides the transmission quality to be good and does not determine the adjustment amount. In contrast, if the Q values of decision targets do not satisfy threshold Qth, the determination unit 33a decides the transmission quality to be bad and decides whether the delay acquired as an SLA is "Premium", which indicates the shortest time. Then, the determination unit 33a determines the adjustment amount to be set for optical transmission devices 2 to be adjusted so that the calculated Q value of the decision target satisfies threshold Qth when the delay acquired as an SLA is "Premium".

Figure 16A:
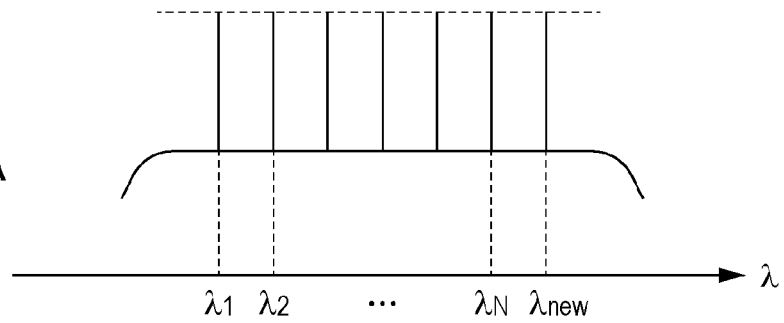
FIGS. 16A to 16C illustrate an example of determining an adjustment amount in embodiment 2.
Figure 16B:
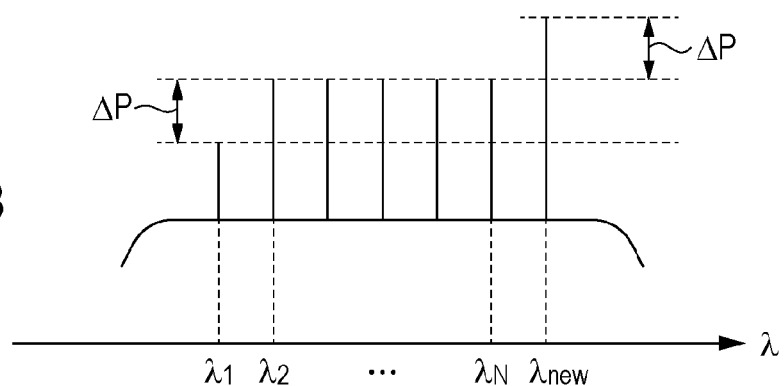
Figure 16C:
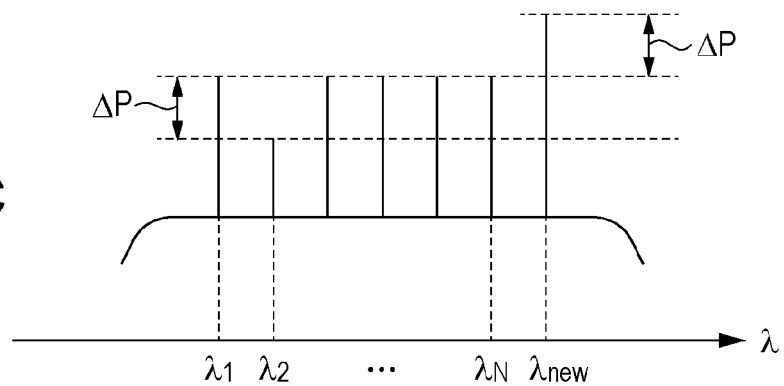

FIGS. 16A to 16C illustrate an example of determining an adjustment amount in embodiment 2. In FIGS. 16A to 16C, the channel corresponding to wavelength $\lambda_{new}$ is a new channel for which an SLA is newly set and the channels corresponding to wavelengths $\lambda_1$ to $\lambda_N$ are existing channels for which an SLA has already been set. FIG. 16A indicates the state in which the adjustment amount to be set for the optical transmission device 2 to be adjusted has not been determined yet.

If the Q value of the new channel among the Q values of channels in the WDM optical signal does not satisfy threshold Qth, the determination unit 33a determines the adjustment amount as described below. That is, the determination unit 33a selects, from existing channels, the existing channel having the maximum difference between its Q value and threshold Qth, as an attenuation target channel. Then, the determination unit 33a determines a temporary adjustment amount (referred to below as a first adjustment amount) that increases the optical power of the new channel by increase amount $\Delta P$ and reduces the optical power of the attenuation target channel by increase amount $\Delta P$. The following case assumes that the difference between the Q value of the existing channel corresponding to wavelengths $\lambda_1$ and threshold Qth is maximum among the existing channels corresponding to wavelengths $\lambda_1$ to $\lambda_N$ depicted in FIG. 16A. In this case, as depicted in FIG. 16B, the determination unit 33 determines the first adjustment amount that increases the optical power of the new channel by increase amount $\Delta P$ and reduces the optical power of the existing channel corresponding to wavelength $\lambda_1$ by increase amount $\Delta P$. As a result, the transparency properties of the WSS with adjustment function 24 in the optical transmission device 2 to be adjusted are changed so that the attenuation amount of the new channel becomes small and the attenuation amount of the existing channel with the largest difference of transmission quality from threshold Qth becomes large, based on the first adjustment amount.

In addition, if the Q value of an attenuation target channel does not satisfy threshold Qth after determination of the first adjustment amount, the determination unit 33a newly selects, as the attenuation target channel, the existing channel having the second-largest difference in place of the existing channel having the maximum difference $\Delta Q$. Then, the determination unit 33a newly determines a temporary adjustment amount (referred to below as a second adjustment amount) for reducing the optical power of the newly selected attenuation target by increase amount $\Delta P$. It is assumed that, for example, the existing channel corresponding to wavelength $\lambda_1$ depicted in FIG. 16B is selected as the attenuation target channel and the Q value of the attenuation target channel does not satisfy threshold Qth. It is also assumed that that the difference between the Q value of the existing channel corresponding to wavelength $\lambda_2$ depicted in FIG. 16B and threshold Qth is the second-largest value. In this case, the determination unit 33a determines the second adjustment amount that reduces the optical power of the existing channel corresponding to wavelength $\lambda_2$ by increase amount $\Delta P$, as depicted in FIG. 16C.

The determination unit 33a decides that the transmission quality is improved when the Q values of all channels in the WDM optical signal including the new channel and existing channels satisfies threshold Qth after determination of temporary adjustment amounts such as the first adjustment amount and the second adjustment amount. Then, the determination unit 33a determines the temporary adjustment amount as the adjustment amount to be set for the optical transmission device 2 to be adjusted. Then, the determination unit 33a sets the determined adjustment amount for the optical transmission device 2 to be adjusted through a LAN or the like.

Upon receiving the adjustment amount from the management device 3a through a LAN or the like, the controller 26 in the optical transmission device 2 adjusts the transparency properties of the WSS with adjustment function 24 based on the adjustment amount. The WSS with adjustment function 24 adjusts the optical power of channels in the WDM optical signal so that the Q values of channels in the WDM optical signal satisfy threshold Qth and outputs the adjusted WDM optical signal. As a result, the quality of services provided using channels in the WDM optical signal individually satisfies the SLA, which are different between channels in the WDM optical signal.

Figure 17:
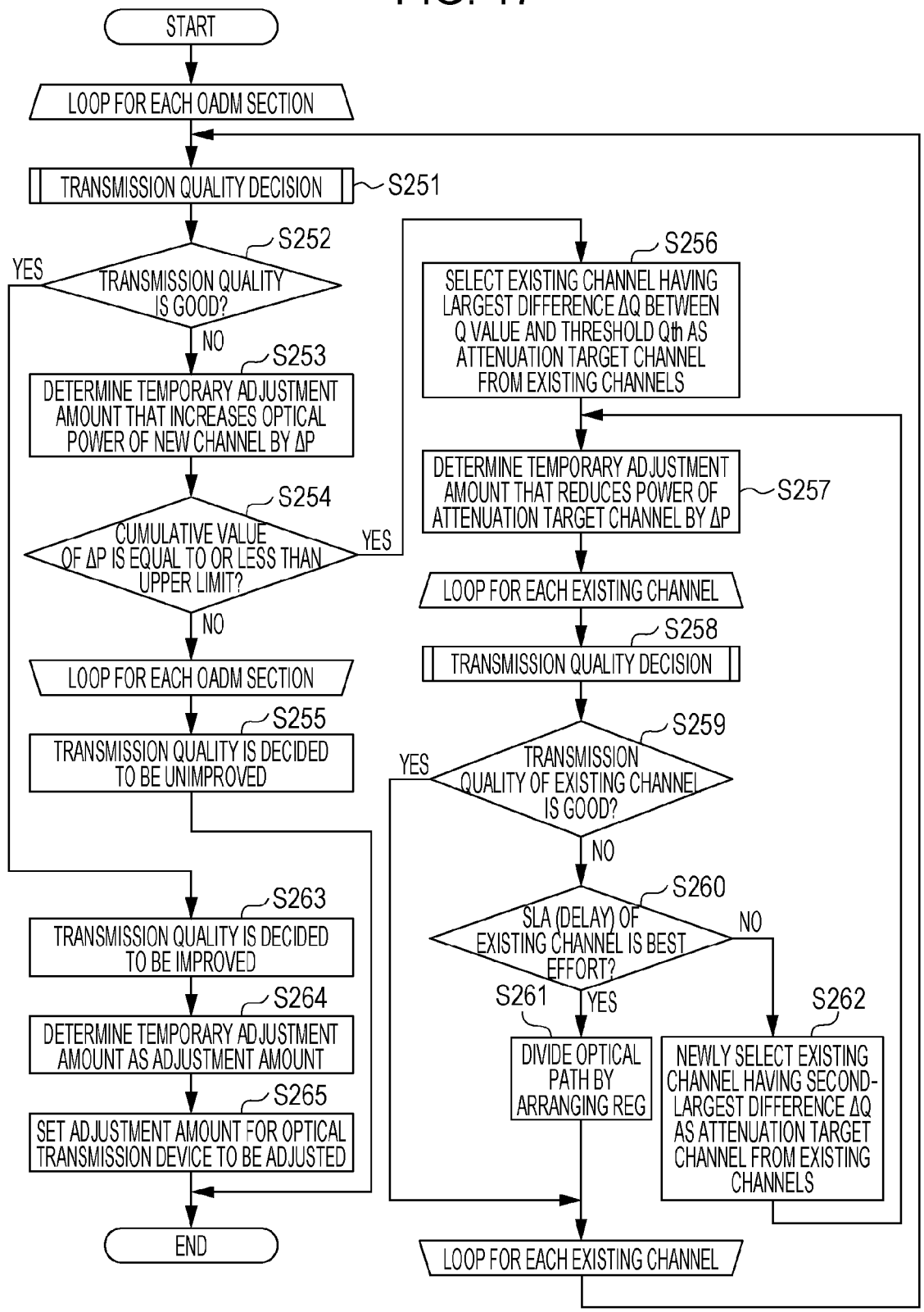
FIG. 17 a flowchart depicting an example of adjustment amount determination of the optical transmission system according to embodiment 2.

Next, the operation of the optical transmission system 1 according to embodiment 2 will be described. FIG. 17 is a flowchart depicting an example of adjustment amount determination of the optical transmission system according to embodiment 2. The adjustment amount determination depicted in FIG. 17 corresponds to the adjustment amount determination depicted in operation S126 of FIG. 9.

As depicted in FIG. 17, the determination unit 33a of the management device 3a performs transmission quality decision (operation S251). Since the transmission quality decision in operation S251 corresponds to the transmission quality decision that was already described with reference to FIG. 11, its detailed description is omitted here.

If the Q value of the new channel among the Q values of channels in the WDM optical signal satisfies threshold Qth, that is, if the transmission quality of the new channel is good (Yes in operation S252), the determination unit 33a lets the processing proceed to operation S263.

In contrast, if the Q value of the new channel among the Q values of channels in the WDM optical signal does not satisfy threshold Qth, that is, when the transmission quality of the new channel is bad (No in operation S252), the determination unit 33a performs the following processing. That is, the determination unit 33a determines a temporary adjustment amount that increases the optical power of the new channel by increase amount $\Delta P$ (operation S253).

If the cumulative value of increase amount $\Delta P$ exceeds a predetermined upper limit (No in operation S254), the determination unit 33a decides that an increase in an adjustment amount does not improve the transmission quality (operation S255) and ends the processing.

In contrast, if the cumulative value of increase amount ΔP is equal to or less than the predetermined upper limit (Yes in operation S254), the determination unit 33a selects, from existing channels, the existing channel having the maximum difference between its Q value and threshold Qth, as an attenuation target channel (operation S256). Then, the determination unit 33a determines a temporary adjustment amount that increases the optical power of the new channel by increase amount ΔP and reduces the optical power of the reduction target channel by increase amount ΔP (operation S257). That is, the determination unit 33a determines the first adjustment amount that increases the optical power of the new channel by increase amount ΔP and reduces the optical power of the attenuation target channel by increase amount ΔP.

The determination unit 33a performs transmission quality decision (operation S258). Since the transmission quality decision in operation S258 corresponds to the transmission quality decision that was already described with reference to FIG. 11, its detailed description is omitted here.

If the Q values of existing channels among the Q values of channels in the WDM optical signal satisfies threshold Qth, that is, if the transmission quality of the existing channels is good (Yes in operation S259), the determination unit 33a lets the processing proceed to operation S251.

In contrast, when the Q values of existing channels among the Q values of channels in the WDM optical signal does not satisfy threshold Qth (No in operation S259), the determination unit 33a determines whether the delay acquired as an SLA of the existing channels is "Best effort" (operation S260).

If the delay acquired as an SLA of the existing channels is "Best effort" (Yes in operation S260), the determination unit 33a divides the optical paths of the existing channels by arranging a REG on the optical paths of the existing channels (operation S261).

In contrast, if the delay acquired as an SLA of the existing channels is not "Best effort" (No in operation S260), the determination unit 33a performs the following processing. That is, the determination unit 33a newly selects, as the attenuation target channel, the existing channel with the second-largest difference ΔQ in place of the existing channel with the largest difference ΔQ (operation S262) and returns the processing to operation S257. Then, in operation S257, the determination unit 33a newly determines the second adjustment amount that reduces the optical power of the attenuation target channel by increase amount ΔP.

In operation S263, the transmission quality of the new channel is good, so the determination unit 33a decides that the transmission quality is improved (operation S263). The determination unit 33a determines temporary adjustment amounts such as the first adjustment amount and the second adjustment amount as the adjustment amounts to be set for the optical transmission device 2 to be adjusted (operation S264). Then, the determination unit 33a sets the determined adjustment amounts for the optical transmission device 2 to be adjusted through a LAN or the like (operation S265).

As described above, if the Q value of the new channel for which an SLA is newly set does not satisfy threshold Qth, the management device 3 according to embodiment 2 determines the first adjustment amount, as an adjustment amount, that increases the optical power of the new channel and reduces the optical power of an existing channel. As a result, in embodiment 2, the optical power of the existing channels is evenly reduced and the transmission quality of the new channel in the WDM optical signal is improved.

If the Q values of existing channels do not satisfy threshold Qth after determination of the first adjustment amount, the management device 3a according to embodiment 2 determines an adjustment amount that increases the optical power of the existing channels and reduces the optical power of the existing channel having the largest difference of transmission quality from threshold Qth. As a result, according to embodiment 2, it is possible to reduce the optical power of the existing channel with the largest difference from threshold Qth and improve the transmission quality of the new channel in the WDM optical signal.

Embodiment 3

Embodiment 2 above depicts an example in which the management device 3 sets an adjustment amount for the optical transmission device 2 to be adjusted when the transmission quality of the new channel for which an SLA is newly set among channels in the WDM optical signal does not satisfy threshold Qth. However, when the transmission quality of the existing channel among channels in the WDM optical signal for which an SLA is changed does not satisfy threshold Qth, the management device 3 may set the adjustment amount for the optical transmission device 2 to be adjusted. The following describes an example in which the management device 3 sets the adjustment amount for the optical transmission devices 2 to be adjusted when the transmission quality of the existing channel among channels in the WDM optical signal for which an SLA is changed does not satisfy threshold Qth. The example of the structure of the optical transmission device and management device in the optical transmission system according to embodiment 3 is the same as in the example of the structure depicted in FIG. 2, so detailed description is omitted.

Figure 18:
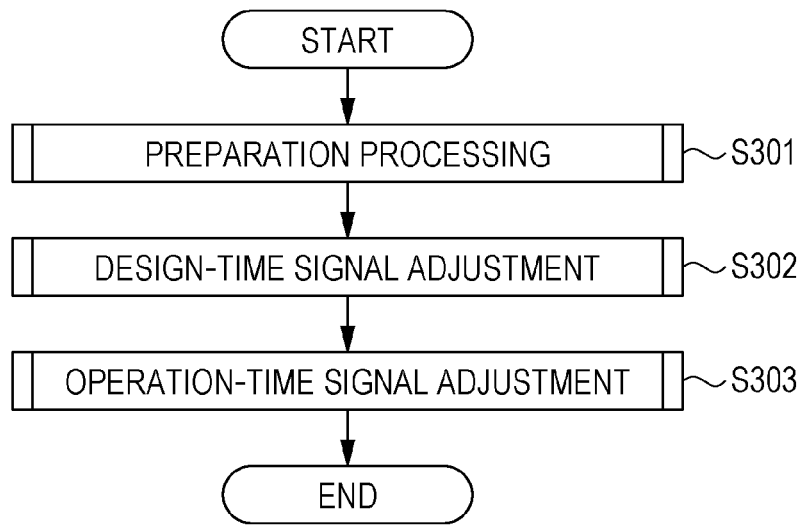
FIG. 18 is a flowchart depicting an example of the entire processing of an optical transmission system according to embodiment 3.

FIG. 18 is a flowchart depicting an example of the entire processing of the optical transmission system according to embodiment 3. In the entire processing depicted in FIG. 18, the management device 3 sets the adjustment amount for the optical transmission device 2 to be adjusted when the transmission quality of the existing channel among channels in the WDM optical signal for which an SLA is changed does not satisfy threshold Qth.

In such a way as described in FIG. 18, the optical transmission system 1 carries out preparation processing such as acquisition of the SLA to be changed among SLAB in existing channels (operation S301). Then, the optical transmission system 1 carries out design-time signal adjustment in which an adjustment amount is set for the optical transmission device 2 to be adjusted, during design of the optical transmission system 1 (operation S302). Then, the optical transmission system 1 carries out operation-time signal adjustment in which the adjustment amount is set for optical transmission devices 2 to be adjusted, during operation of the optical transmission system 1 (operation S303). Preparation processing, design-time signal adjustment, and operation-time signal adjustment will be described in detail below in sequence.

Figure 19:
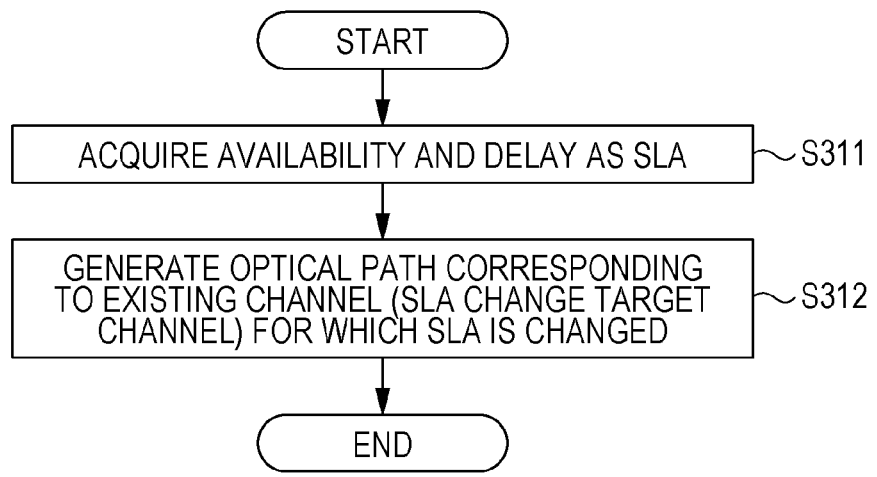
FIG. 19 is a flowchart depicting an example of the preparation processing of the optical transmission system according to embodiment 3.

First, preparation processing in operation S301 of FIG. 18 will be described in detail. FIG. 19 is flowchart depicting an example of the preparation processing of the optical transmission system according to embodiment 3. Preparation processing depicted in FIG. 19 corresponds to operation S301 depicted in FIG. 18. As depicted in FIG. 19, the acquisition unit 31 of the management device 3 acquires availability Pa and delay as an SLA using an input unit such as a user interface (operation S311). For example, the acquisition unit 31 acquires availability Pa and delay in relation to information of combination of a pair of optical transmission devices 2, which are the transmission source and transmission destination of the WDM optical signal in network demand information, and information of the signal type of the WDM optical signal. The delay is one of "Premium", "Normal", and "Best effort".

The management device 3 generates an optical path corresponding to the existing channel (referred to below as an SLA change target channel) for which an SLA is changed based on network demand information (operation S312).

Figure 20:
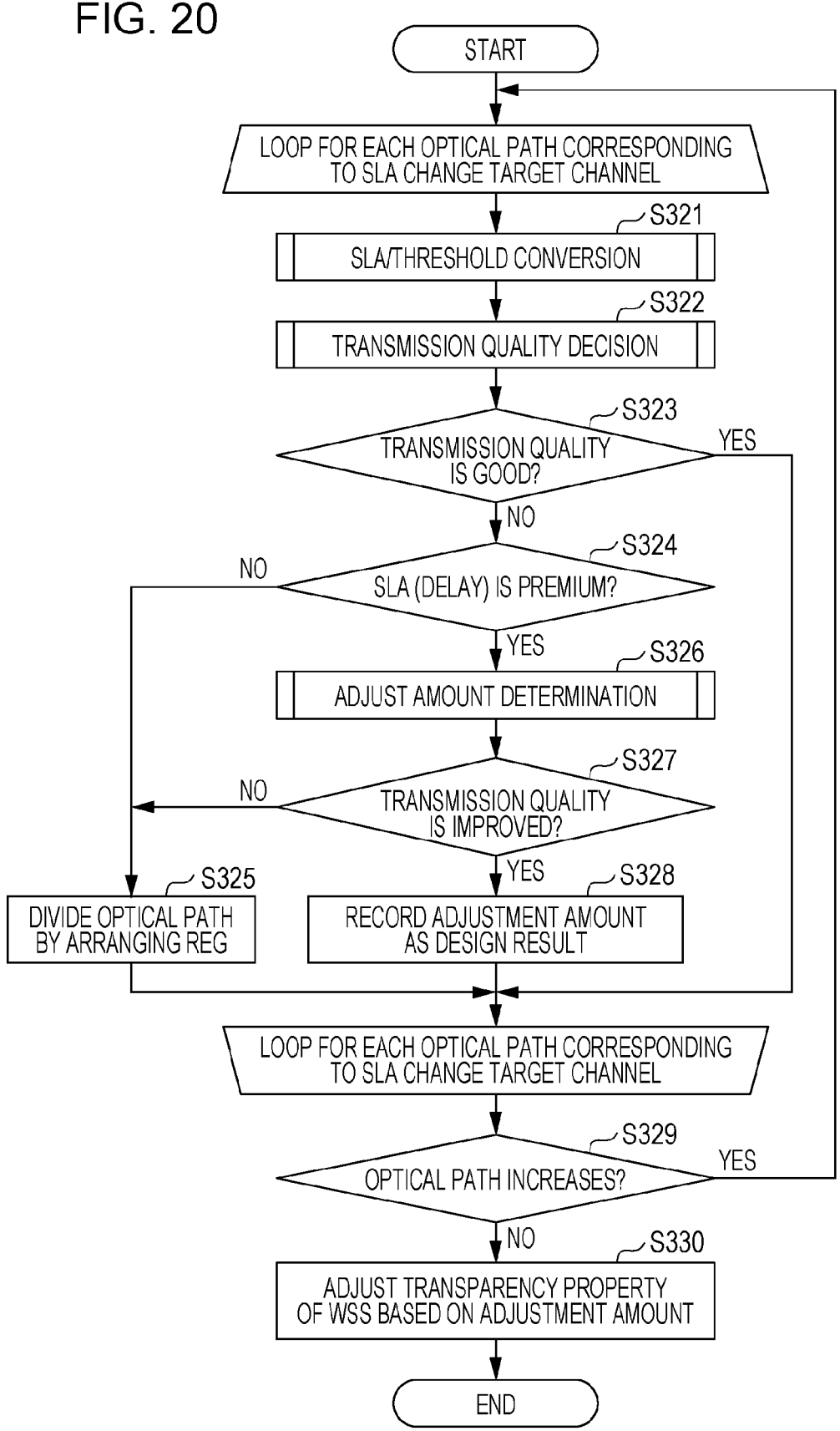
FIG. 20 is a flowchart depicting an example of design-time signal adjustment of the optical transmission system according to embodiment 3.

Next, design-time signal adjustment in operation S302 of FIG. 18 will be described in detail. FIG. 20 is a flowchart depicting an example of design-time signal adjustment of the optical transmission system according to embodiment 3. The design-time signal adjustment depicted in FIG. 20 corresponds to operation S302 depicted in FIG. 18. As described in FIG. 20, the converter 32 of the management device 3 performs SLA/threshold conversion that converts an SLA into threshold Qth (operation S321). Since the SLA/threshold conversion in operation S321 corresponds to the SLA/threshold conversion that was already described with reference to FIG. 10, its detailed description is omitted here.

The determination unit 33 of the management device 3 performs transmission quality decision for deciding the transmission quality by using threshold Qth acquired through SLA/threshold conversion (operation S322). Since the transmission quality decision in operation S322 corresponds to the transmission quality decision that was already described with reference to FIG. 11, its detailed description is omitted here.

If the transmission quality is good (Yes in operation S323), the determination unit 33 lets the processing proceed to operation S329 without determining an adjustment amount.

In contrast, when the transmission quality is bad (No in operation S323), the determination unit 33 determines whether the delay acquired as an SLA is "Premium" (operation S324).

If the delay acquired as an SLA is not "Premium" (No in operation S324), the determination unit 33 divides the optical path of the new channel by arranging a regenerator (REG) on the optical path of the new channel (operation S325). The REG may be arranged using a method bisecting distance, a method bisecting the number of spans, or other existing methods.

In contrast, if the delay acquired as an SLA is "Premium" (Yes in operation S324), the determination unit 33 performs adjustment amount determination in which an adjustment amount is determined so that the Q value of a decision target calculated by transmission quality decision satisfies threshold Qth (operation S326).

Figure 21:
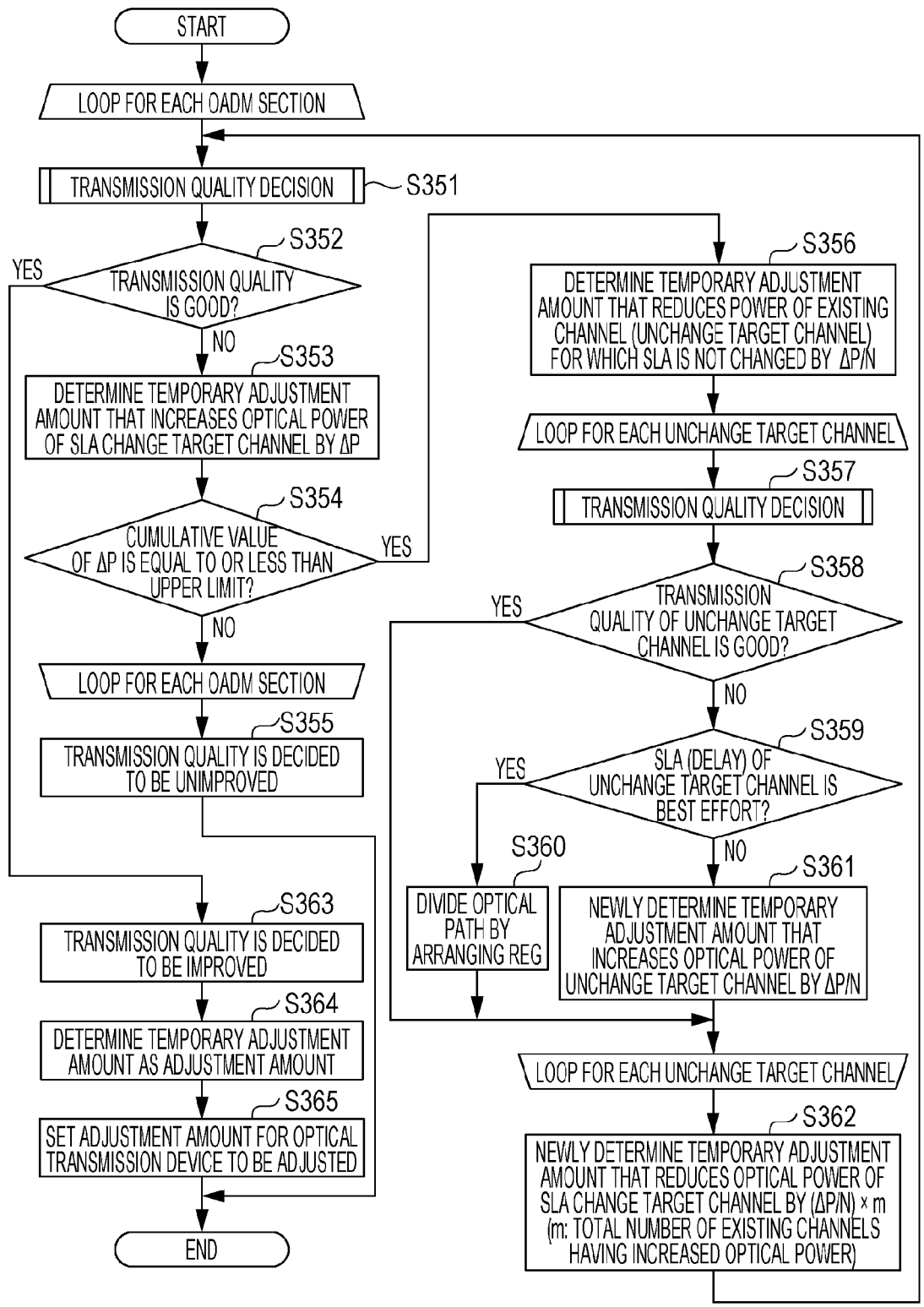
FIG. 21 is a flowchart depicting an example of adjustment amount determination of the optical transmission system according to embodiment 3.

An example of adjustment amount determination in operation S326 will be described with reference to FIG. 21. FIG. 21 is a flowchart depicting an example of adjustment amount determination of the optical transmission system according to embodiment 3.

As depicted in FIG. 21, the determination unit 33 of the management device 3 performs transmission quality decision (operation S351). Since the transmission quality decision in operation S351 corresponds to the transmission quality decision that was already described with reference to FIG. 11, its detailed description is omitted here.

If the Q value of the new channel among the Q values of channels in the WDM optical signal satisfies threshold Qth, that is, if the transmission quality of the new channel is good (Yes in operation S352), the determination unit 33 lets the processing proceed to operation S363.

In contrast, if the Q value of an SLA change target channel among the Q values of channels in the WDM optical signal does not satisfy threshold Qth, that is, when the transmission quality of the SLA change target channel is bad (No in operation S352), the determination unit 33 performs the following processing. That is, the determination unit 33 determines a temporary adjustment amount that increases the optical power of the SLA change target channel by increase amount $\Delta P$ (operation S353).

If the cumulative value of increase amount $\Delta P$ exceeds a predetermined upper limit (No in operation S354), the determination unit 33 decides that an increase in the adjustment amount does not improve the transmission quality (operation S355) and ends the processing.

In contrast, if the cumulative value of increase amount $\Delta P$ is equal to or less than the predetermined upper limit (Yes in operation S354), the determination unit 33 determines the temporary adjustment amount that reduces the optical power of the existing channels for which an SLA is not changed by $\Delta P/N$ (operation S356). Hereinafter, an existing channel for which an SLA is not changed is called "an unchange target channel". That is, the determination unit 33 determines the first adjustment amount that increases the optical power of an SLA change target channel by increase amount $\Delta P$ and reduces the optical power of the unchange target channel by reduction amount $\Delta P/N$.

The determination unit 33 performs transmission quality decision (operation S357). Since the transmission quality decision in operation S357 corresponds to the transmission quality decision that was already described with reference to FIG. 11, its detailed description is omitted here.

If the Q value of the unchange target channel among the Q values of channels in the WDM optical signal satisfies threshold Qth, that is, if the transmission quality of the unchange target channel is good (Yes in operation S358), the determination unit 33 lets the processing proceed to operation S362.

In contrast, if the transmission quality of the unchange target channel is bad (No in operation S358), the determination unit 33 determines whether the delay acquired as an SLA of the unchange target channel is "Best effort" (operation S359).

If the delay acquired as an SLA of a unchange target channel is "Best effort" (Yes in operation S359), the determination unit 33 performs the following processing. That is, the determination unit 33 divides the optical path of the unchange target channel by arranging a REG on the optical path of the unchange target channel (operation S360).

In contrast, if the delay acquired as the SLA of the unchange target channel is not "Best effort" (No in operation S359), the determination unit 33 performs the following processing. That is, the determination unit 33 newly determines a temporary adjustment amount that increases the optical power of the unchange target channel not satisfying threshold Qth among unchange target channels by reduction amount $\Delta P/N$ (operation S361).

The determination unit 33 newly determines a temporary adjustment amount that reduces the optical power of the SLA change target channel by $(\Delta P/N) \times m$ obtained by multiplying the total number m of existing channels by reduction amount $\Delta P/N$ (operation S362) and returns the processing to operation S351. That is, after determining the first adjustment amount, the determination unit 33 determines the second adjustment amount that increases the optical power of the unchange target channels that do not satisfy threshold Qth by $\Delta P/N$ and reduces the optical power of the unchange target channels by $(\Delta P/N)$ multiplied by the total number of unchange target channels.

In operation S363, the transmission quality of the new channel is good, so the determination unit 33 decides that the transmission quality is improved (operation S363). Then, the determination unit 33 determines temporary adjustment amounts such as the first adjustment amount and the second adjustment amount as the adjustment amounts to be set for the optical transmission device 2 to be adjusted (operation S364). Then, the determination unit 33 sets the determined adjustment amounts for the optical transmission device 2 to be adjusted through a LAN or the like (operation S365).

Returning to the description of FIG. 20, if adjustment amount determination does not improve the transmission quality (No in operation S327), the determination unit 33 lets the processing proceed to operation S325.

In contrast, if adjustment amount determination improves the transmission quality (Yes in operation S327), the determination unit 33 records the adjustment amount in an internal memory or the like as the design result (operation S328).

Then, if the path of the SLA change target channel is increased (Yes in operation S329), the determination unit 33 returns the processing to operation S321. In contrast, if the optical path of the SLA change target channel is not increased (No in operation S329), the determination unit 33 lets the processing proceed to operation S330.

The controller 26 of the optical transmission device 2 to be adjusted adjusts the transparency properties of the WSS with adjustment function 24 based on an adjustment amount set by the management device 3 (operation S330) and ends design-time signal adjustment. As a result, the WSS with adjustment function 24 adjusts the optical power of channels in the WDM optical signal so that the Q values of channels in the WDM optical signal satisfy threshold Qth and outputs the adjusted WDM optical signal.

Figure 22:
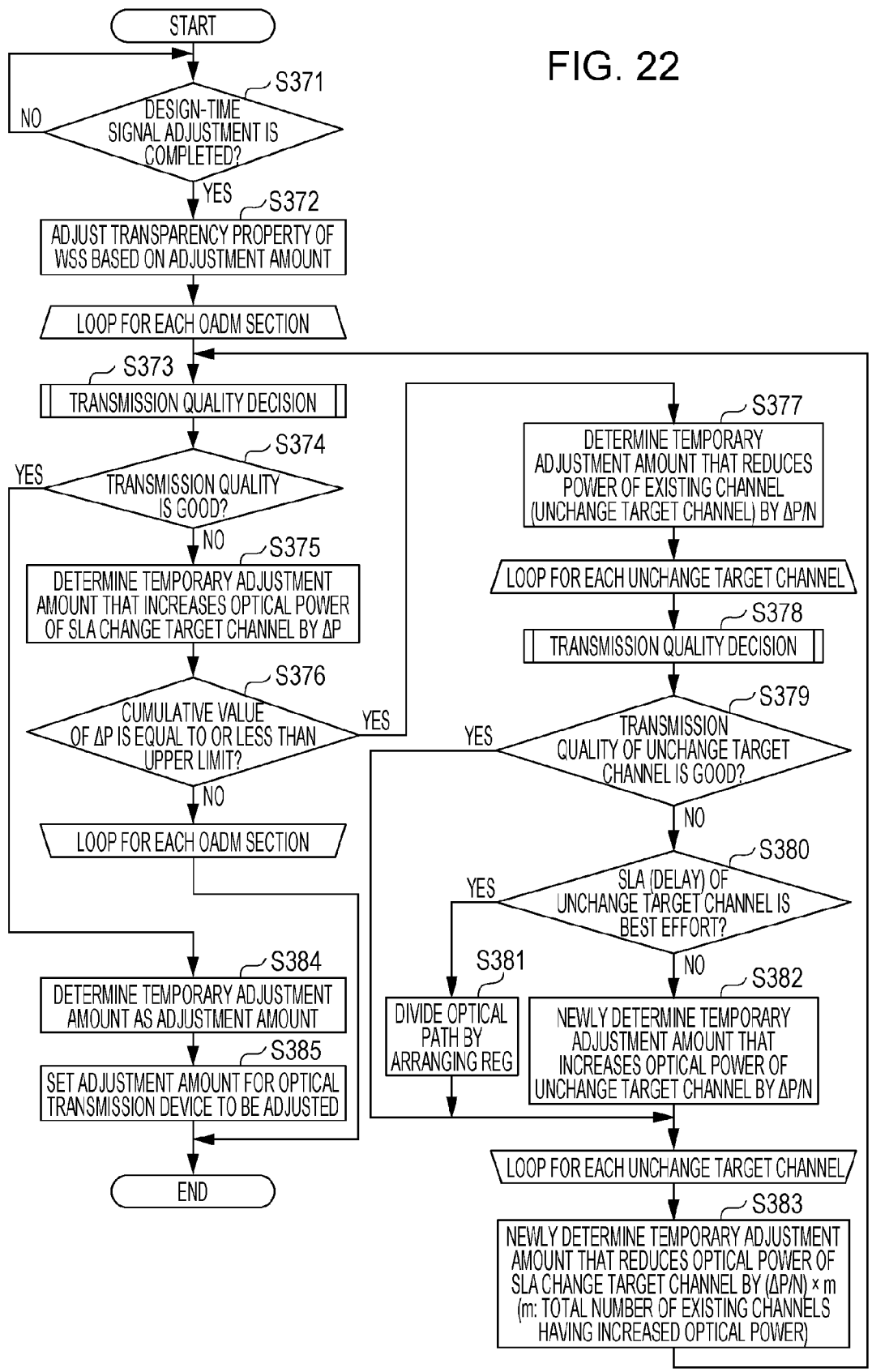
FIG. 22 is a flowchart depicting an example of operation-time signal adjustment of the optical transmission system according to embodiment 3.

Next, operation-time signal adjustment depicted operation S303 in FIG. 18 will be described in detail. FIG. 22 is a flowchart depicting an example of operation-time signal adjustment of the optical transmission system according to embodiment 3.

As depicted in FIG. 22, upon completion of design-time signal adjustment (Yes in operation S371), the controller 26 of the optical transmission device 2 to be adjusted adjusts the transparency properties of the WSS with adjustment function 24 continuously based on the adjustment amount set by the management device 3 (operation S372).

The determination unit 33 of the management device 3 performs transmission quality decision (operation S373). Since the transmission quality decision in operation S373 corresponds to the transmission quality decision that was already described with reference to FIG. 11, its detailed description is omitted here.

If the Q value of the new channel satisfies threshold Qth among the Q values of channels in the WDM optical signal does not satisfy threshold Qth, that is, when the transmission quality of the new channel is good (Yes in operation S374), the determination unit 33 lets the processing proceed to operation S384.

In contrast, if the Q value of the SLA change target channel among the Q values of channels in the WDM optical signal does not satisfy threshold Qth, that is, when the transmission quality of the SLA change target channel is bad (No in operation S374), the determination unit 33 performs the following processing. That is, the determination unit 33 determines a temporary adjustment amount that increases the optical power of the SLA change target channel by increase amount $\Delta P$ (operation S375).

If the cumulative value of increase amount $\Delta P$ exceeds a predetermined upper limit (No in operation S376), the determination unit 33 ends operation-time signal adjustment.

In contrast, if the cumulative value of increase amount $\Delta P$ is equal to or less than the predetermined upper limit (Yes in operation S376), the determination unit 33 determines a temporary adjustment amount that reduces the optical power of unchange target channel by reduction amount $\Delta P/N$ (operation S377). That is, the determination unit 33 determines the first adjustment amount that increases the optical power of the SLA change target channel by increase amount $\Delta P$ and reduces the optical power of unchange target channel by reduction amount $\Delta P/N$.

The determination unit 33 performs transmission quality decision (operation S378). Since the transmission quality decision in operation S378 corresponds to the transmission quality decision that was already described with reference to FIG. 11, its detailed description is omitted here.

If the Q value of the unchange target channel among the Q values of channels in the WDM optical signal satisfies threshold Qth, that is, when the transmission quality of the unchange target channel is good (Yes in operation S379), the determination unit 33 lets the processing proceed to operation S383.

In contrast, if the transmission quality of the unchange target channel is bad (No in operation S379), the determination unit 33 determines whether the delay acquired as the SLA of the unchange target channel is "Best effort" (operation S380).

If the delay acquired as the SLA of the unchange target channel is "Best effort" (Yes in operation S380), the determination unit 33 performs the following processing. That is, the determination unit 33 divides the optical path of the unchange target channel by arranging a REG on the optical path of the unchange target channel (operation S381).

In contrast, if the delay acquired as the SLA of the unchange target channel is not "Best effort" (No in operation S380), the determination unit 33 performs the following processing. That is, the determination unit 33 newly determines a temporary adjustment amount that increases the optical power of the unchange target channel not satisfying threshold Qth among unchange target channels by reduction amount $\Delta P/N$ (operation S382).

The determination unit 33 newly determines a temporary adjustment amount that reduces the optical power of the new channel by $(\Delta P/N) \times m$ obtained by multiplying the total number m of unchange target channels by reduction amount $\Delta P/N$ (operation S383) and returns the processing to operation S373. That is, after determining the first adjustment amount, the determination unit 33 determines the second adjustment amount that increases the optical power of the existing channel by reduction amount $\Delta P/N$ and reduces the optical power of the new channel by the total number of existing channels multiplied by reduction amount $\Delta P/N$.

In operation S384, the determination unit 33 determines temporary adjustment amounts such as the first adjustment amount and the second adjustment amount as the adjustment amounts to be set for the optical transmission device 2 to be adjusted (operation S384). Then, the determination unit 33 sets the determined adjustment amounts for the optical transmission device 2 to be adjusted through a LAN or the like (operation S385).

As described above, the management device 3 according to embodiment 3 determines the adjustment amount that increases the optical power of the SLA change target channel and reduces the optical power of the unchange target channel if the Q value of the SLA change target channel does not satisfy threshold Qth. As a result, in embodiment 3, the optical power of the existing channels for which an SLA is not changed is evenly reduced and the transmission quality of the existing channels for which an SLA is changed is improved.

Modification

Figure 23:
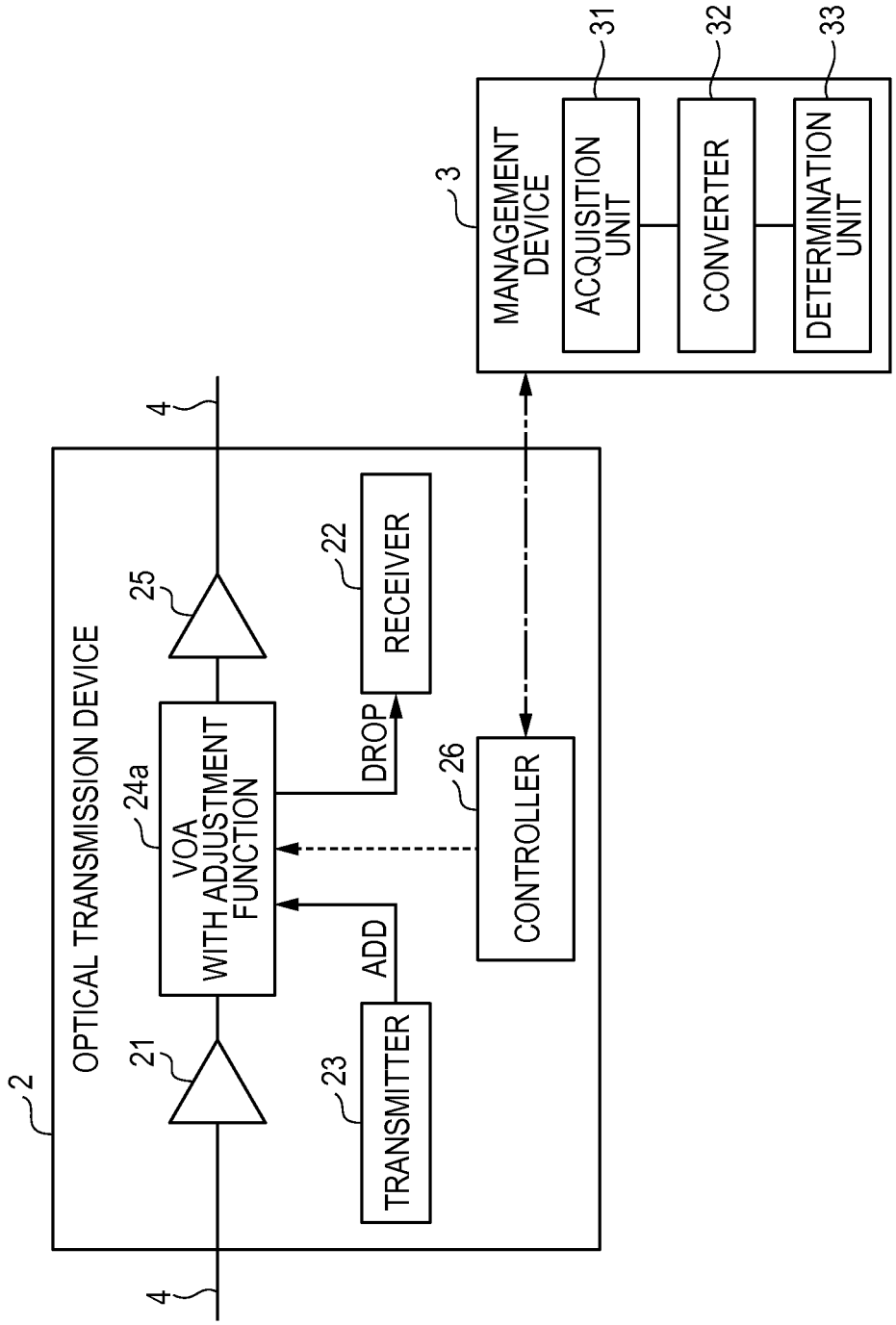
FIG. 23 illustrates an example of the structure of an optical transmission device and the structure of a management device in an optical transmission system according to a modification of embodiment 1.

In the optical transmission device according to embodiment 1, the WSS with adjustment function 24 for adjusting the optical power of channels in the WDM optical signal is disposed in the optical transmission device 2. However, the optical transmission device 2 may include a variable optical attenuator (VOA) with adjustment function 24a that adjusts the optical power of channels in the WDM optical signal in place of the WSS with adjustment function 24, as depicted in FIG. 23. FIG. 23 illustrates an example of the structure of an optical transmission device and the structure of a management device in an optical transmission system according to a modification of embodiment 1. In a modification according to embodiment 1, it is possible to adjust the transmission quality of channels in the WDM optical signal on an autonomous basis depending on the SLA, as in embodiment 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
a plurality of optical transmission devices that transmit a wavelength division multiplexed (WDM) optical signal through an optical transmission path, a respective optical transmission device including
an adjustment unit configured to adjust optical power of channels in the WDM optical signal, and
a controller configured to control the adjustment unit based on an adjustment amount including a first adjustment amount when transmission quality of a particular channel among other channels in the WDM optical signal does not satisfy a threshold value of transmission quality to be satisfied by the channels and a second adjustment amount, after the first adjustment amount, when at least one of the other channels in the WDM optical signal other than the particular channel does not satisfy the threshold value; and
a management device to manage the plurality of optical transmission devices, the management device including
a converter configured to convert an evaluation value for evaluating quality of service provided by using the channels in the WDM optical signal into the threshold value of transmission quality to be satisfied by the channels, and
a determination unit configured to
calculate the transmission quality of the channels based on monitoring information of the channels in the WDM optical signal adjusted by the adjusting unit of at least one of the plurality of optical transmission devices, and
determine the adjustment amount to be set for the optical transmission device so that the calculated transmission quality of the channels in the WDM optical signal satisfy the threshold value when a delay time allowed during transmission of the WDM optical signal and acquired as the evaluation value indicates a shortest time.

2. The optical transmission system according to claim 1, wherein
the management device further includes an acquisition unit configured to acquire, as the evaluation value, a ratio of a time period for which the WDM optical signal is actually transmitted through the optical transmission path to a time period for which the service is provided and the delay time allowed during transmission of the WDM optical signal, and
the converter converts the ratio acquired by the acquisition unit as the evaluation value into the threshold value.

3. The optical transmission system according to claim 2, wherein the determination unit determines, as the adjustment amount, the first adjustment amount obtained by, when the transmission quality of a particular channel among the calculated transmission quality of the channels in the WDM optical signal does not satisfy the threshold value, increasing the optical power of the particular channel by a predetermined increase amount and reducing optical power of other channels other than the particular channel by a reduction amount obtained by dividing the increase amount by the number of the other channels.

4. The optical transmission system according to claim 3, wherein the determination unit further determines, as the adjustment amount, the second adjustment amount obtained by, when the transmission quality of at least one of the other channels does not satisfy the threshold value after determining the first adjustment amount, increasing optical power of the at least one of the other channels by the reduction amount and reducing the optical power of the particular channel by an amount obtained by multiplying the reduction amount by the number of the at least one of the other channels.

5. The optical transmission system according to claim 3, wherein the particular channel is a new channel for which the evaluation value is newly set among the channels in the WDM optical signal, and the other channels are existing channels for which the evaluation value has already been set.

6. The optical transmission system according to claim 3, wherein the particular channel is an existing channel for which the evaluation value is changed among the channels in the WDM optical signal, and the other channels are existing channels for which the evaluation value is not changed.

7. The optical transmission system according to claim 2, wherein the determination unit determines, as the adjustment amount, the first adjustment amount obtained by, when the transmission quality of a particular channel among the calculated transmission quality of the channels in the WDM optical signal does not satisfy the threshold value, increasing the optical power of the particular channel by a predetermined increase amount and reducing optical power of a first channel other than the particular channel, the first channel having the largest difference from the threshold value, by the increase amount.

8. The optical transmission system according to claim 7, wherein, if the transmission quality of the first channel does not satisfy the threshold value after the determination unit determines the first adjustment amount, the determination unit further determines, as the adjustment amount, the second adjustment amount obtained by reducing the optical power of a second channel having a second largest difference by the increase amount, in place of the first channel having the largest different.

9. The optical transmission system according to claim 1, wherein the determination unit determines, as the adjustment amount, the first adjustment amount obtained by, when the transmission quality of a particular channel among the calculated transmission quality of the channels in the WDM optical signal does not satisfy the threshold value, increasing the optical power of the particular channel by a predetermined increase amount and reducing optical power of the other channels other than the particular channel by a reduction amount obtained by dividing the increase amount by the number of the other channels.

10. The optical transmission system according to claim 9, wherein the determination unit further determines, as the adjustment amount, the second adjustment amount obtained by, when the transmission quality of at least one of the other channels does not satisfy the threshold value after determining the first adjustment amount, increasing optical power of the at least one of the other channels by the reduction amount and reducing the optical power of the particular channel by an amount obtained by multiplying the reduction amount by a number of the at least one of the other channels.

11. The optical transmission system according to claim 9, wherein the particular channel is a new channel for which the evaluation value is newly set among the channels in the WDM optical signal, and the other channels are existing channels for which the evaluation value has already been set.

12. The optical transmission system according to claim 9, wherein the particular channel is an existing channel for which the evaluation value is changed among the channels in the WDM optical signal, and the other channels are existing channels for which the evaluation value is not changed.

13. The optical transmission system according to claim 1, wherein the determination unit determines, as the adjustment amount, the first adjustment amount obtained by, when the transmission quality of a particular channel among the calculated transmission quality of the channels in the WDM optical signal does not satisfy the threshold value, increasing the optical power of the particular channel by a predetermined increase amount and reducing optical power of a first channel other than the particular channel, the first channel having the largest difference from the threshold value, by the increase amount.

14. The optical transmission system according to claim 13, wherein, if the transmission quality of the first channel does not satisfy the threshold value after the determination unit determines the first adjustment amount, the determination unit further determines, as the adjustment amount, the second adjustment amount obtained by reducing the optical power of a second channel having a second largest difference by the increase amount, in place of the first channel having the largest different.

15. A management device that manages a plurality of optical transmission devices that transmit a wavelength division multiplexed (WDM) optical signal through an optical transmission path, the management device comprising:
a converter configured to convert an evaluation value for evaluating quality of service provided by using the channels in the WDM optical signal into a threshold value of transmission quality to be satisfied by the channels; and
a determination unit configured to
calculate the transmission quality of the channels based on monitoring information of the channels in the WDM optical signal adjusted by at least one of the plurality of optical transmission devices, and
determine the adjustment amount to be set for the optical transmission device so that the calculated transmission quality of the channels in the WDM optical signal satisfy the threshold value when a delay time allowed during transmission of the WDM optical signal and acquired as the evaluation value indicates a shortest time, the adjustment amount including a first adjustment amount when transmission quality of a particular channel among other channels in the WDM optical signal does not satisfy the threshold value of transmission quality to be satisfied by the channels and a second adjustment amount, after the first adjustment amount, when at least one of the other channels in the WDM optical signal other than the particular channel does not satisfy the threshold value.

16. A signal adjustment method using an optical transmission system including a plurality of optical transmission devices that transmit a wavelength division multiplexed (WDM) optical signal through an optical transmission path and a management device that manages the plurality of optical transmission devices, the signal adjustment method comprising:
converting, by the management device, an evaluation value for evaluating quality of service provided by using channels in the WDM optical signal into a threshold value of transmission quality to be satisfied by the channels;
calculating, by the management device, the transmission quality of the channels based on monitoring information of the channels in the WDM optical signal adjusted by at least one of the plurality of optical transmission devices;
determining, by the management device, the adjustment amount to be set for the optical transmission device so that the calculated transmission quality of the channels in the WDM optical signal satisfy the threshold value when a delay time allowed during transmission of the WDM optical signal and acquired as the evaluation value indicates a shortest time, the adjustment amount including a first adjustment amount when transmission quality of a particular channel among other channels in the WDM optical signal does not satisfy the threshold value of transmission quality to be satisfied by the channels and a second adjustment amount, after the first adjustment amount, when at least one of the other channels in the WDM optical signal other than the particular channel does not satisfy the threshold value;
setting, by the optical transmission device, the adjustment amount determined by the management device for the optical transmission device; and
adjusting optical power of the channels in the WDM optical signal, by the optical transmission device, based on the adjustment amount set by the optical transmission device.

* * * * *